US011951504B2

(12) United States Patent
Numata

(10) Patent No.: US 11,951,504 B2
(45) Date of Patent: Apr. 9, 2024

(54) BLOWER AND SPRAYER ATTACHMENT

(71) Applicant: MAKITA CORPORATION, Anjo (JP)

(72) Inventor: Fumitoshi Numata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 37 days.

(21) Appl. No.: 17/684,904

(22) Filed: Mar. 2, 2022

(65) Prior Publication Data

US 2022/0305508 A1 Sep. 29, 2022

(30) Foreign Application Priority Data

Mar. 25, 2021 (JP) ................................ 2021-051103

(51) Int. Cl.
*B05B 7/24* (2006.01)

(52) U.S. Cl.
CPC .......... *B05B 7/2413* (2013.01); *B05B 7/2416* (2013.01)

(58) Field of Classification Search
CPC ... B05B 7/0869; B05B 7/2408; B05B 7/2413; B05B 7/2416; B05B 15/63
USPC ......................... 239/291, 337, 526–528, 600
See application file for complete search history.

(56) References Cited

U.S. PATENT DOCUMENTS

| | | | | |
|---|---|---|---|---|
| 4,993,639 A * | 2/1991 | Hata | B05B 7/2435 | 239/289 |
| 6,409,097 B1 * | 6/2002 | McCauley | B05B 7/1413 | 239/289 |
| 6,837,447 B1 * | 1/2005 | Clark | B05B 7/2427 | 239/289 |
| 9,414,580 B2 * | 8/2016 | Franks | A01M 1/2033 | |
| 2016/0023225 A1 * | 1/2016 | Decker | A01M 7/0046 | 239/8 |
| 2020/0222923 A1 * | 7/2020 | Osborne | B05B 3/022 | |
| 2021/0331187 A1 * | 10/2021 | Youngblut | B05B 15/652 | |
| 2022/0032439 A1 | 2/2022 | Numata | | |

FOREIGN PATENT DOCUMENTS

WO 2007/019604 A1 2/2007

* cited by examiner

*Primary Examiner* — Cody J Lieuwen
(74) *Attorney, Agent, or Firm* — Oliff PLC

(57) ABSTRACT

An electric blower is configured to blow air. The blower includes a body configured such that a sprayer attachment is attachable thereto. The body is configured to be carried integrally with the sprayer attachment with the sprayer attachment attached to the body. The sprayer attachment includes a container, a nozzle and a liquid supply passage. The container is configured to store a liquid. The nozzle has a discharge opening. The liquid supply passage is connected to the container and the nozzle to lead the liquid.

15 Claims, 16 Drawing Sheets

BLOWER AND SPRAYER ATTACHMENT

CROSS-REFERENCE TO RELATED APPLICATION

The present application claims priority to Japanese patent application No. 2021-051103 filed on Mar. 25, 2021, the contents of which are hereby fully incorporated herein by reference.

TECHNICAL FIELD

The present disclosure relates to an electric blower and a sprayer attachment attachable to the blower.

BACKGROUND

Some of known blowers, which are capable of blowing air from a discharge opening, can fulfill an additional function other than blowing air when an attachment is attached to the blower. For example, International Application Publication No. WO 2007/019604 discloses a blower that is capable of spraying water that is supplied from a container through a tube.

SUMMARY

When using the above-described blower for spraying the water, a user needs to carry the container separately from the blower. This blower therefore leaves room for further improvement.

Accordingly, an object of the present disclosure is to provide an improvement of a blower that can provide an additional function other than blowing air. Another object of the present disclosure is to provide an improvement of an attachment that is attachable to the blower.

One aspect of the present disclosure herein provides an electric blower that is configured to blow air. The blower includes a body that is configured such that a sprayer attachment is attachable (mountable, connectable) thereto. The body is configured to be carried integrally with the sprayer attachment with the sprayer attachment attached to the body. The sprayer attachment includes a container, a nozzle and a liquid supply passage (channel). The container is configured to store a liquid. The nozzle has a discharge opening. The liquid supply passage is connected to the container and the nozzle, and configured to lead the liquid.

The electric blower of this aspect can be utilized as a sprayer when the sprayer attachment is attached thereto. This enhances the convenience of the blower. Further, the body of the blower can be carried integrally with the sprayer attachment with the sprayer attachment attached thereto. Thus, this aspect provides the blower that is easy to handle even when the sprayer attachment is attached to the blower.

Another aspect of the present disclosure herein provides a sprayer attachment that is attachable to an electric blower that is configured to blow air. The sprayer attachment includes a container, a nozzle and a liquid supply passage. The container is configured to store a liquid and configured to be attached to a body of the blower. The nozzle has a discharge opening and is configured to be attached to the body of the blower. The liquid supply passage is connected to the container and the nozzle.

The sprayer attachment of this aspect can be attached to the electric blower to provide the blower with an additional function as a sprayer. Further, both the container and the nozzle can be attached to the body of the blower, so that the sprayer attachment can be carried integrally with the blower when attached to the body of the blower. Thus, this aspect provides the sprayer attachment that is easy to handle even when the sprayer attachment is attached to the blower.

DETAILED DESCRIPTION OF THE EMBODIMENTS

Figure 1:
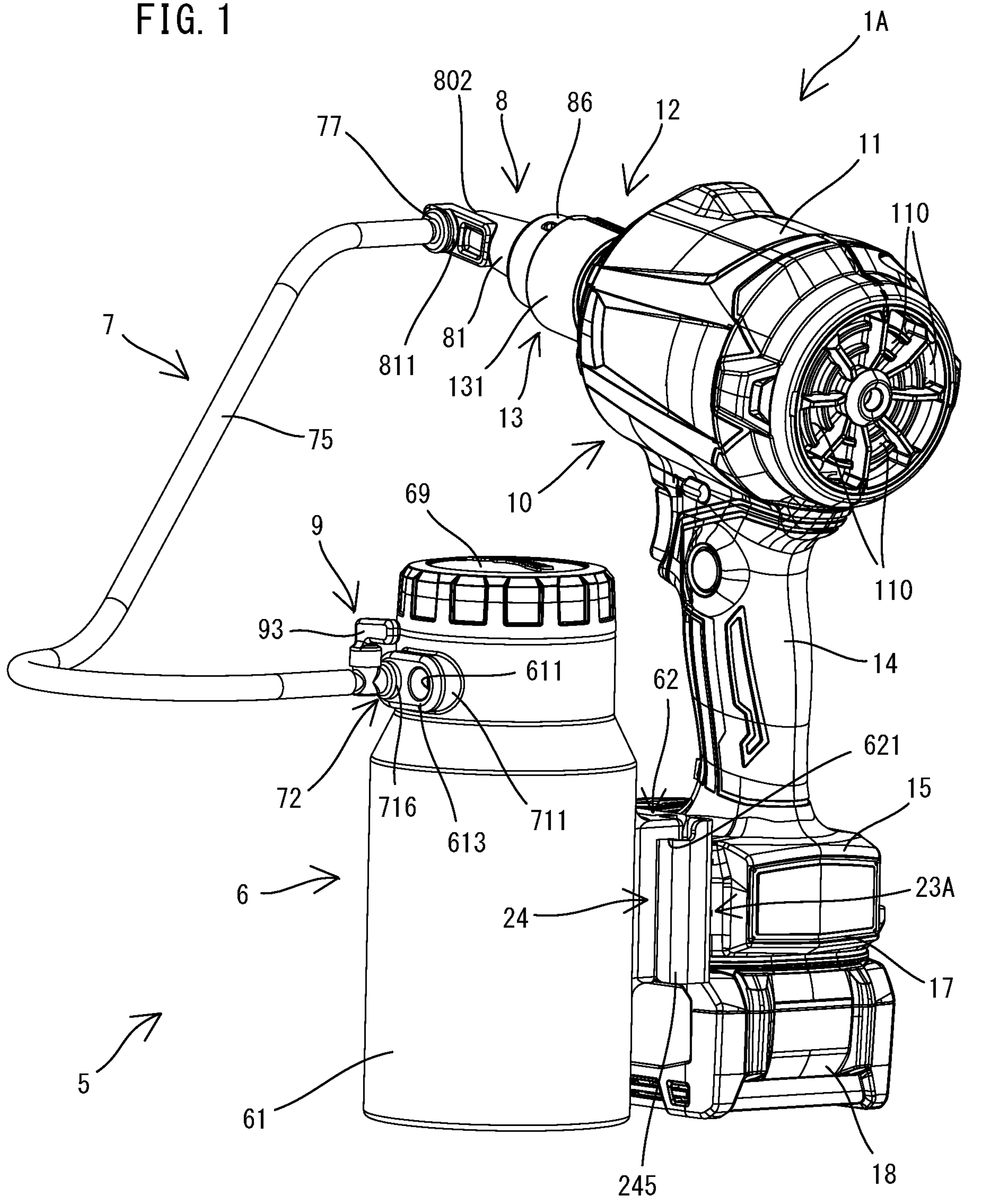
FIG. 1 is a perspective view of an air duster with a sprayer attachment attached thereto.

In one non-limiting embodiment according to the present disclosure, the body of the blower may include at least one container-mounting part and a nozzle-mounting part. The at least one container-mounting part may be configured such that the container is attachable (mountable, connectable) thereto. The nozzle-mounting part may be configured such that the nozzle of the sprayer attachment is attachable (mountable, connectable) thereto. With this structure, the container and the nozzle of the sprayer attachment can be attached to the body of the blower. Thus, the sprayer attachment can be stably attached to the blower.

In addition or in the alternative to the preceding embodiment, the at least one container-mounting part may include a plurality of container-mounting parts disposed at (in) different positions on the body. With this structure, a user can selectively attach the container to an appropriate one of the two container-mounting parts, depending on the working environment (e.g., a surrounding space). Thus, the maneuverability of the air duster with the sprayer attachment attached thereto can be improved.

In addition or in the alternative to the preceding embodiments, the nozzle-mounting part may be provided along a first axis. The body may include a grip part configured to be held by a user and extending along a second axis that crosses (intersects) the first axis. The container-mounting parts may include two container-mounting parts disposed on both sides of a plane that contains the first and second axes. The nozzle-mounting part may be configured such that the nozzle is selectively attachable to the nozzle-mounting part at either one of two nozzle attachment positions (nozzle mounting positions) that are different in a circumferential direction around the first axis. With this structure, the user can selectively attach the container to an appropriate one of the two container-mounting parts, depending on the working environment (e.g., a surrounding space). Further, the user can selectively attach the nozzle to an appropriate one of the two nozzle attachment positions according to the position of the container. Thus, the maneuverability of the air duster with the sprayer attachment attached thereto can be further improved.

In addition or in the alternative to the preceding embodiments, the blower may further include a motor, and a fan configured to be rotated by the motor to blow the air from the discharge opening of the nozzle attached to the body. The body may include a housing part, a grip part and a battery-mounting part. The housing part may extend along the first axis and house the motor and the fan. The grip part may be configured to be held by a user and protrude from the housing part along a second axis that crosses (intersects) the first axis. The battery-mounting part may be connected to a protruding end of the grip part and configured to removably receive a battery for supplying power to the motor. The at least one container-mounting part may be on a side portion of the battery-mounting part. With this structure, the container can be placed at (in) a position where the container does not easily interference with the user and where the container can be relatively stably held.

In addition or in the alternative to the preceding embodiments, the blower may further include a holder configured to removably hold the container. The holder may be formed separately from the body. The holder may be removably fixed to the at least one container-mounting part. The at least one container-mounting part may be configured to removably receive the container via the holder. With this structure, the holder having required characteristics (e.g., shape and strength) can be separately (independently) manufactured, without relation to restrictions of the body of the blower. In a case where the at least one container-mounting part includes a plurality of container-mounting parts, the holder may be removably fixed selectively to one of the container-mounting parts.

In addition or in the alternative to the preceding embodiments, the holder may include a fixed part and a movable part. The fixed part may be removably fixed to the at least one container-mounting part. The movable part may be configured to removably hold the container and connected to the fixed part so as to be movable relative to the fixed part. With this structure, the orientation (attitude) of the container relative to the fixed part and the blower can be changed. Thus, for example, the orientation of the container relative to the blower can be changed, depending on the working environment (e.g., the orientation of the blower relative to the horizontal direction).

In addition or in the alternative to the preceding embodiments, the movable part may be rotatably (pivotably) connected to the fixed part. This structure facilitates the change in the orientation (attitude) of the container relative to the fixed part and the blower.

In addition or in the alternative to the preceding embodiments, the movable part may be configured to rotate (pivot) relative to the fixed part owing to a weight of the container held by the movable part and a weight of the liquid stored in the container. With this structure, the movable part can rotate (pivot) relative to the fixed part and the orientations of the movable part and the container relative to the direction of gravity can be maintained, without need for the user to change the orientation of the movable part. Therefore, the possibility of spillage of the liquid from the container can be reduced.

In addition or in the alternative to the preceding embodiments, the container of the sprayer attachment may be configured to be attached to and detached from the body of the blower without need for using an auxiliary tool. With this structure, the sprayer attachment can be easily attached to and detached from the blower.

In addition or in the alternative to the preceding embodiments, the sprayer attachment may further include a valve configured to open and close the liquid supply passage in response to manipulation of the valve by a user. With this structure, by closing the valve when the sprayer attachment is not in use, the user can reduce the possibility of spillage of the liquid through the liquid supply passage.

In addition or in the alternative to the preceding embodiments, one end portion of the liquid supply passage may have a connecting part configured to be removably connected to the nozzle. With this structure, the liquid supply passage can be separated from the nozzle, so that the nozzle can be easily attached to the body of the blower. Further, the blower and the sprayer attachment are improved in ease and convenience of storage when not in use.

In addition or in the alternative to the preceding embodiments, the container may have a holding part configured to removably hold the connecting part of the liquid supply passage. With this structure, the blower and the sprayer attachment are further improved in ease and convenience of storage when not in use.

In addition or in the alternative to the preceding embodiments, the container may have a vent hole through which an inside of the container communicates with an outside. The holding part may define at least a portion of the vent hole of the container and may be configured to receive the connecting part fitted therein. With this structure, the liquid remaining within the liquid supply passage can be discharged into the container through the vent hole.

Non-limiting embodiments according to the present disclosure are now specifically described with reference to the drawings.

First Embodiment

An air duster 1A and a sprayer attachment 5 according to a first embodiment are now described with reference to FIGS. 1 to 11. The air duster 1A is an example of an electric blower that is configured to blow off grit, dust etc., by compressing air and discharging compressed air. The sprayer attachment 5 is an example of an attachment that is configured to be additionally attached (mounted, coupled, connected) to the air duster 1A to enable the air duster 1A to function as a sprayer.

First, the structure of the air duster 1A is described.

As shown in FIGS. 1 to 4, the air duster 1A includes a body 10 that forms an outer shell of the air duster 1A. The body 10 is a hollow body, and may also be referred to as a housing. The body 10 includes a housing part 11, a nozzle part 12, a grip part 14, a controller-housing part 15 and a battery-mounting part 17.

A motor 31 and a fan 33 are disposed within the housing part 11. In this embodiment, a DC brushless motor is employed as the motor 31. A centrifugal fan is employed as the fan 33. An output shaft 311 of the motor 31 and the fan 33 are integrally rotationally driven around an axis A1. The housing part 11 extends along the axis A1. Openings (inlet openings) 110 for introducing air into the housing part 11 are formed in one end portion of the housing part 11 in a longitudinal direction of the housing part 11 (an extension direction of the axis A1).

The nozzle part 12 basically has a tapered funnel shape and extends along the axis A1 from the other end portion in the longitudinal direction of the housing part 11. An end opening at a distal (front) end of the nozzle part 12 defines a discharge opening (outlet) 120, through which air is discharged out of the body 10. A distal (front) end portion (protruding end portion) of the nozzle part 12 has a hollow cylindrical shape. Various kinds of nozzles, including a nozzle 8 of the sprayer attachment 5, can be selectively attached (mounted, coupled, connected) to the distal end portion of the nozzle part 12. The distal end portion of the nozzle part 12 is hereinafter also referred to as a nozzle-mounting part 121. A user can use the air duster 1A without a nozzle attached thereto or with an appropriate nozzle attached thereto, depending on a desired operation to be performed. In this embodiment, the nozzle part 12 has a locking mechanism 13 that is configured to lock a nozzle to the air duster 1A in a specified attachment position (mounting position). The nozzle can be attached to the nozzle-mounting part 121 via the locking mechanism 13.

The grip part 14 is an elongate portion that is configured to be held (gripped) by the user. The grip part 14 protrudes from the housing part 11 in a direction that crosses (intersects) the axis A1. Thus, a longitudinal axis of the grip part 14 extends such that it crosses (intersects) a longitudinal axis of the housing part 11 (i.e., the axis A1).

In the following description, for the sake of convenience, the extension direction of the axis A1 (the longitudinal direction of the housing part 11) is defined as a front-rear direction of the air duster 1A. In the front-rear direction, a direction from the inlet openings 110 toward the discharge opening 120 is defined as a forward direction, while the opposite direction (the direction from the discharge opening 120 toward the inlet openings 110) is defined as a rearward direction. A direction that is orthogonal to the axis A1 and that generally corresponds to an extension direction of the grip part 14 (a longitudinal direction of the grip part 14) is defined as an up-down direction of the air duster 1A. In the up-down direction, a direction in which the grip part 14 protrudes from the housing part 11 (the direction from the housing part 11 toward a protruding end (free end) of the grip part 14) is defined as a downward direction, while the opposite direction (the direction from the protruding end of the grip part 14 toward the housing part 11) is defined as an upward direction. A direction that is orthogonal to the front-rear direction and the up-down direction is defined as a left-right direction.

A trigger 141 is provided on an upper end portion of the grip part 14. The trigger 141 is configured to be manually depressed by the user. A switch (not shown) is housed within the grip part 14. The switch is configured to be turned ON when the trigger 141 is manually depressed. The controller-housing part 15 is connected to a lower end portion of the grip part 14. The controller-housing part 15 has a rectangular box-like shape. A controller 37 is disposed within the controller-housing part 15 (see FIG. 5). The controller 37 is configured to control driving of the motor 31. The controller 37 drives the motor 31 while the trigger 141 is manually depressed by the user and the switch is ON. While the fan 33 is rotated, air is sucked into the housing part 11 through the inlet openings 110, and the air is compressed and then discharged outside through the discharge opening 120. In a case where a nozzle is attached to the air duster 1A, the compressed air flows into the nozzle from the discharge opening 120 and is discharged outside through a discharge opening of the nozzle.

The battery-mounting part 17 is disposed below the controller-housing part 15. The battery-mounting part 17 forms a lower end portion of the body 10. The battery-mounting part 17 is configured to removably receive a battery 18 for supplying electric power to various components (the motor 31, the controller 37, etc.) of the air duster 1A.

Figure 5:
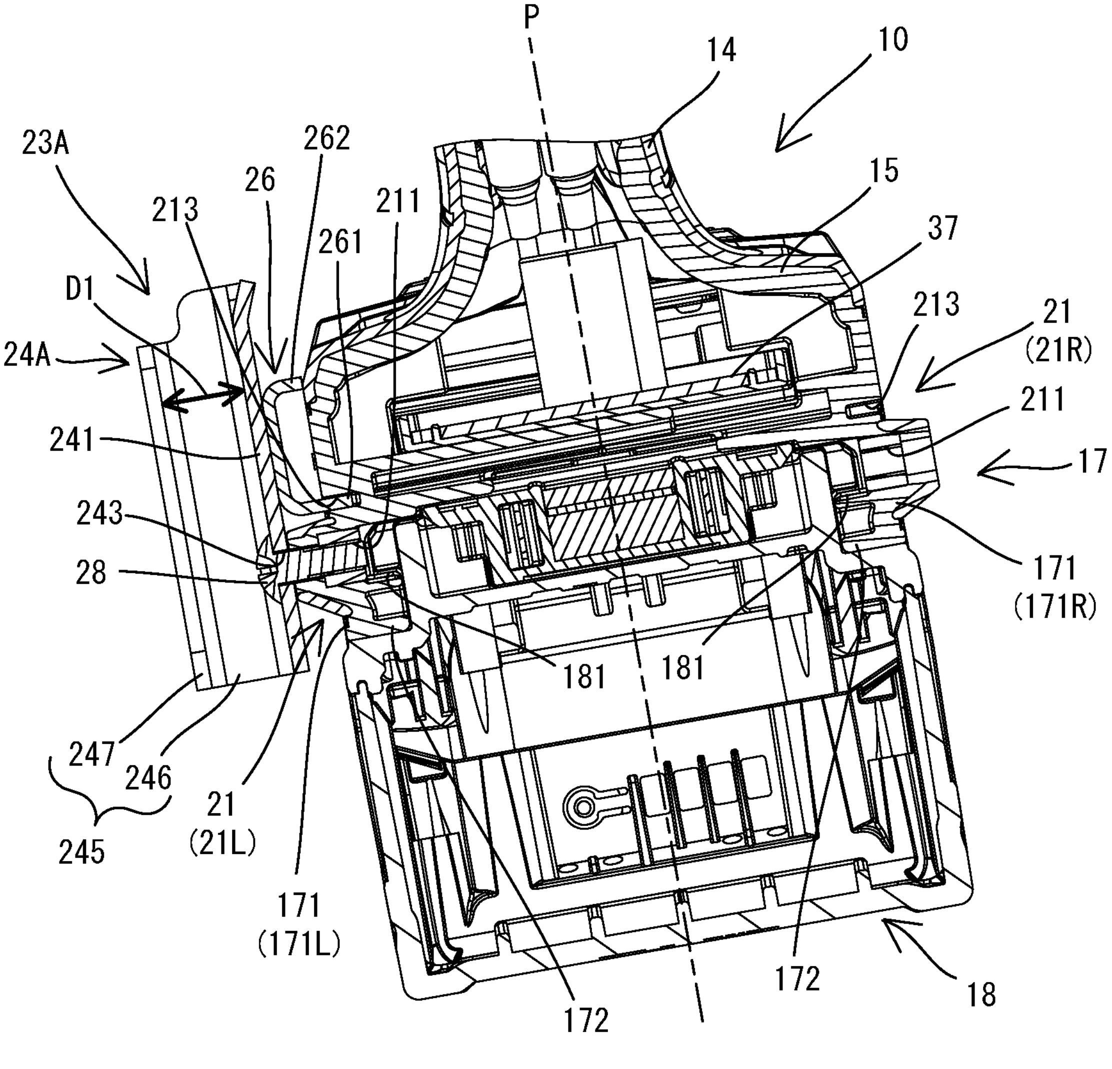
FIG. 5 is a sectional view taken along line V-V in FIG. 3.

The structures of the battery 18 and the battery-mounting part 17 are well-known and therefore only briefly described here. As shown in FIG. 5, a pair of grooves 181 are formed on left and right upper end portions of the battery 18, respectively. The grooves 181 extend substantially in the front-rear direction. The battery-mounting part 17 includes a pair of side walls 171 (a left wall 171L and a right wall 171R) and rails 172 respectively formed on the left and right walls 171L, 171R. The rails 172 protrude inward from inner surfaces of the left and right walls 171L, 171R and extend substantially in the front-rear direction. The rails 172 are engageable with the grooves 181 of the battery 18 by sliding. Although not shown in detail, a hook, which is movable in the up-down direction, is provided on the upper end portion of the battery 18, while a recess, which is engageable with the hook, is provided in the battery-mounting part 17.

When the battery 18 is mounted on the battery-mounting part 17, the grooves 181 and the hook of the battery 18 engage with the rails 172 and the recess of the battery-mounting part 17, respectively, so that the battery 18 is placed at (in) a specified position on the battery-mounting part 17. When the battery 18 is thus positioned, terminals of the battery-mounting part 17 are electrically connected to terminals of the battery 18, and thus the electric power is supplied to the various components of the air duster 1A.

Figure 4:
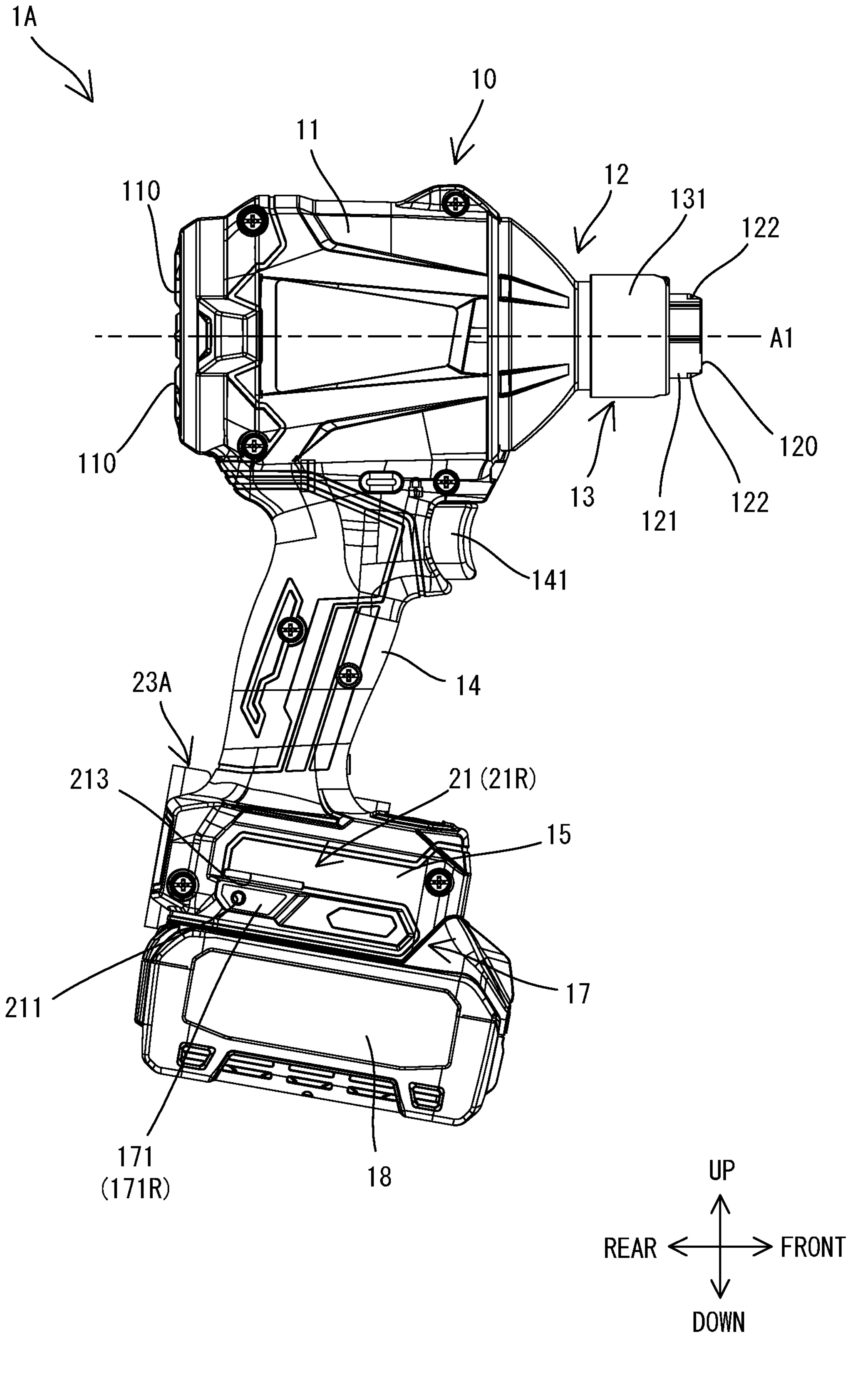
FIG. 4 is a right side view of the air duster.

Further, as shown in FIGS. 4 and 5, in this embodiment, two container-mounting parts 21 are provided on the battery-mounting part 17 (more specifically, on the side walls 171). Each of the container-mounting parts 21 is configured such that a container 6 (see FIG. 1) of the sprayer attachment 5 can be attached (mounted, coupled, connected) thereto. The container-mounting parts 21 are arranged in symmetry relative to an imaginary plane P that passes the center of the air duster 1A (specifically, of the body 10 or the battery-mounting part 17) in the left-right direction and that extends in the up-down direction. The plane P is also a plane that contains the axis A1 (the longitudinal axis of the housing part 11) and the longitudinal axis of the grip part 14. When referred collectively or without distinction, each of the two container-mounting parts 21 is simply referred to as the container-mounting part 21. The container-mounting part 21 on the left side of the plane P may also be referred to as a left mounting part 21L and the container-mounting part 21 on the right side of the plane P may also be referred to as a right mounting part 21R.

In this embodiment, the body 10 of the air duster 1A is configured to removably receive (hold) the container 6 via a container holder 23A. Thus, each of the container-mounting parts 21 is configured such that the container holder 23A is removably attached (mounted, coupled, connected) thereto. More specifically, each of the container-mounting parts 21 has a threaded hole 211 and a locking groove 213 that are formed in each of the side walls 171 of the battery-mounting part 17. The threaded hole 211 is formed in a rear portion of the side wall 171. The locking groove 213 is formed above the threaded hole 211 of the side wall 171. The locking groove 213 linearly extends substantially in the front-rear direction (more specifically, slightly obliquely upward toward the rear).

The user can selectively attach the container holder 23A to either one of the two container-mounting parts 21, and then attach the container 6 of the sprayer attachment 5 to the body 10 via the container holder 23A. In this embodiment, most of the body 10, including the battery-mounting part 17, is made of synthetic resin (polymeric material, plastic), while the container holder 23A is made of metal (e.g. iron alloy, aluminum alloy, etc.).

Figure 3:
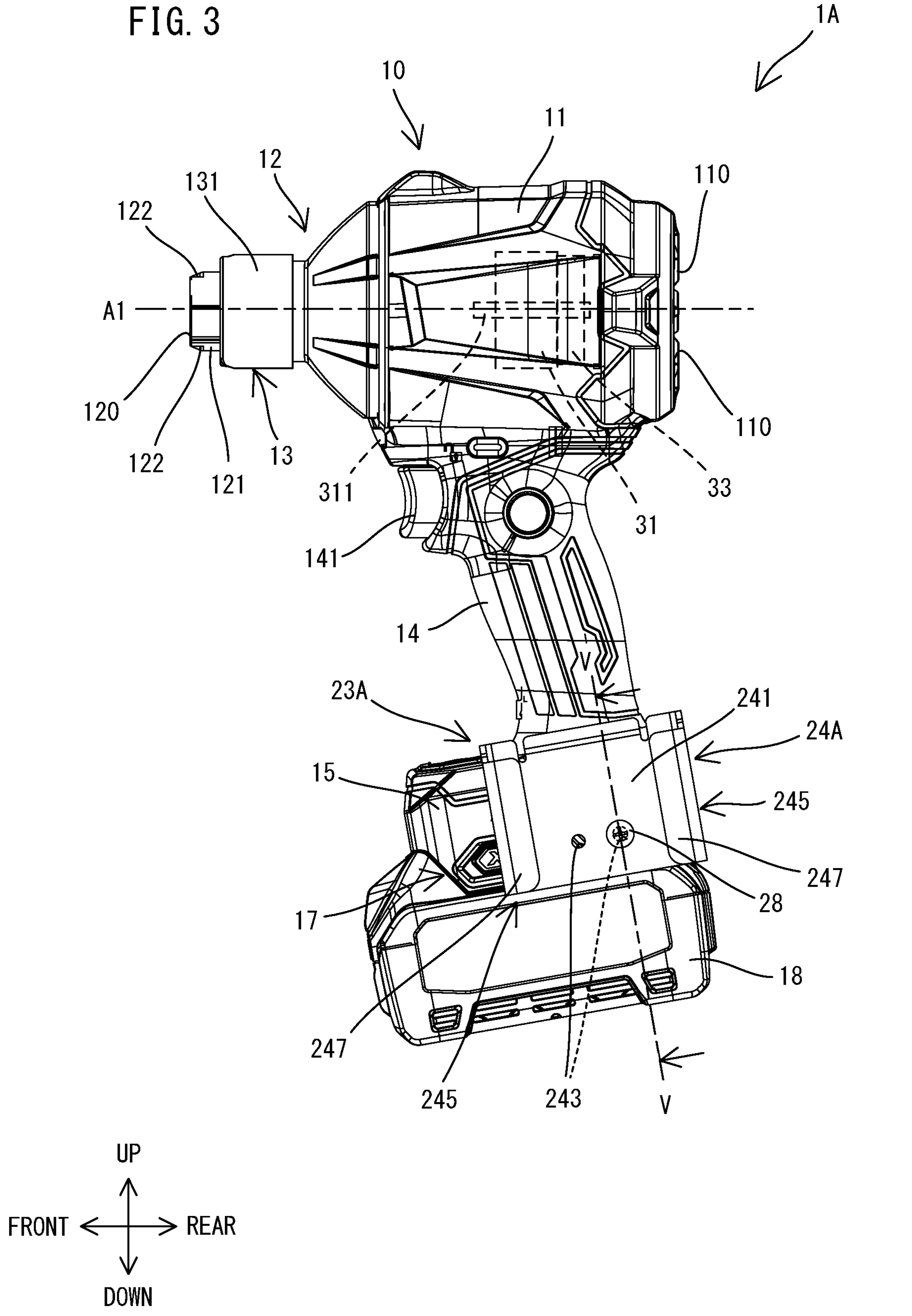
FIG. 3 is a left side view of the air duster.
Figure 6:
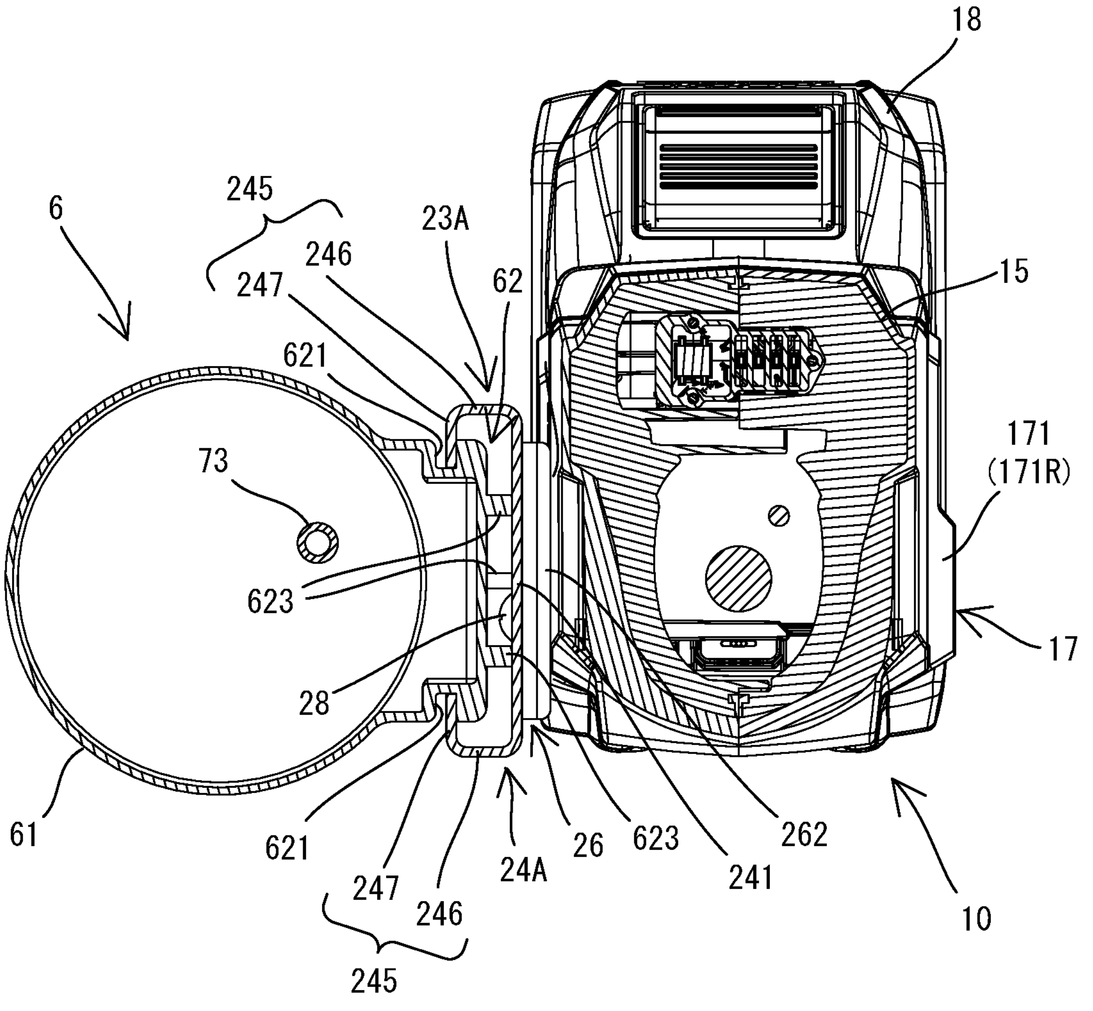
FIG. 6 is a sectional view taken along line VI-VI in FIG. 2.

The container holder 23A is now described. As shown in FIGS. 3, 5 and 6, the container holder 23A includes a holder body 24A and an engagement part 26.

The holder body 24A is a single (jointless, seamless) bent metal plate-like member. The holder body 24A is configured to removably receive (hold) the container 6. The holder body 24A includes a base part 241 and two bent parts 245.

The base part 241 is a generally rectangular portion of the holder body 24A. When the container holder 23A is attached to the air duster 1A, a long-side direction and a short-side direction of the base part 241 substantially correspond to the front-rear direction and the up-down direction of the air duster 1A, respectively. Therefore, the long-side direction, the short-side direction and a thickness direction of the base part 241 are hereinafter also referred to as a front-rear direction, an up-down direction and a left-right direction of the container holder 23A. Two through holes 243 for a screw 28 are formed in a lower central portion of the base part 241. The through holes 243 are spaced apart from each other in the front-rear direction.

The two bent parts 245 are bent and extend from both ends of the base part 241 in the front-rear direction (the long-side direction). Each of the bent parts 245 has a generally L-shaped section and includes a first part 246 and a second part 247. The first parts 246 respectively protrude substantially orthogonally to the base part 241 from the front and rear ends of the base part 241. The second parts 247 protrude substantially in parallel to the base part 241 from respective protruding ends of the first parts 246. The second parts 247 extend toward each other. The base part 241 and the second parts 247 are spaced apart from each other by a distance D1 (see FIG. 5) in the left-right direction, so that a space is formed between the base part 241 and the second parts 247. A portion (specifically, an engagement part 62) of the container 6 can be disposed (placed) in this space. Protruding ends of the second parts 247 are spaced apart from each other in the front-rear direction. The two through holes 243 of the base part 241 are located between the protruding ends of the second parts 247.

The engagement part 26 is a metal plate-like member formed separately from the holder body 24A. The base part 241 has a first face, from which the bent part 245 protrudes, and a second face, which is an opposite surface that faces the side wall 171 when the base part 241 is attached to the body 10. The engagement part 26 is inseparably fixed to the second face of the base part 241. The engagement part 26 has a lower end portion 261 and an upper end portion 262 that are bent to protrude away from the base part 241. The length of protrusion of the lower end portion 261 from the base part 241 is longer than the length of protrusion of the upper end portion 262 from the base part 241. The lower end portion 261 is disposed above the through holes 243. A central portion of the lower end portion 261 is shaped to conform to the locking groove 213 (to be fitted in locking groove 213) of the container-mounting part 21.

The user can selectively attach (mount, couple, connect) the container holder 23A having the above-described structure to the left mounting part 21L or to the right mounting part 21R with the screw 28. More specifically, the user fits (inserts) the central portion of the lower end portion 261 of the engagement part 26 of the container holder 23A into the locking groove 213 of the container-mounting part 21 (the left mounting part 21L or the right mounting part 21R). Thus, the container holder 23A is placed at (in) a proper position relative to the container-mounting part 21, and the rear one of the through holes 243 of the base part 241 faces (opposes) the threaded hole 211 of the container-mounting part 21 in the left-right direction. Then the user fixes the container holder 23A to the container-mounting part 21 by inserting the screw 28 through the through hole 243 and screwing the screw 28 into the threaded hole 211. In this embodiment, the upper end portion 262 of the engagement part 26 abuts on an upper end portion of a side wall of the controller-housing part 15, so that the container holder 23A is more stably fixed.

Further, the user can easily detach (remove) the container holder 23A from the container-mounting part 21 by loosening and removing the screw 28.

The structure of the sprayer attachment 5 is now described.

Figure 2:
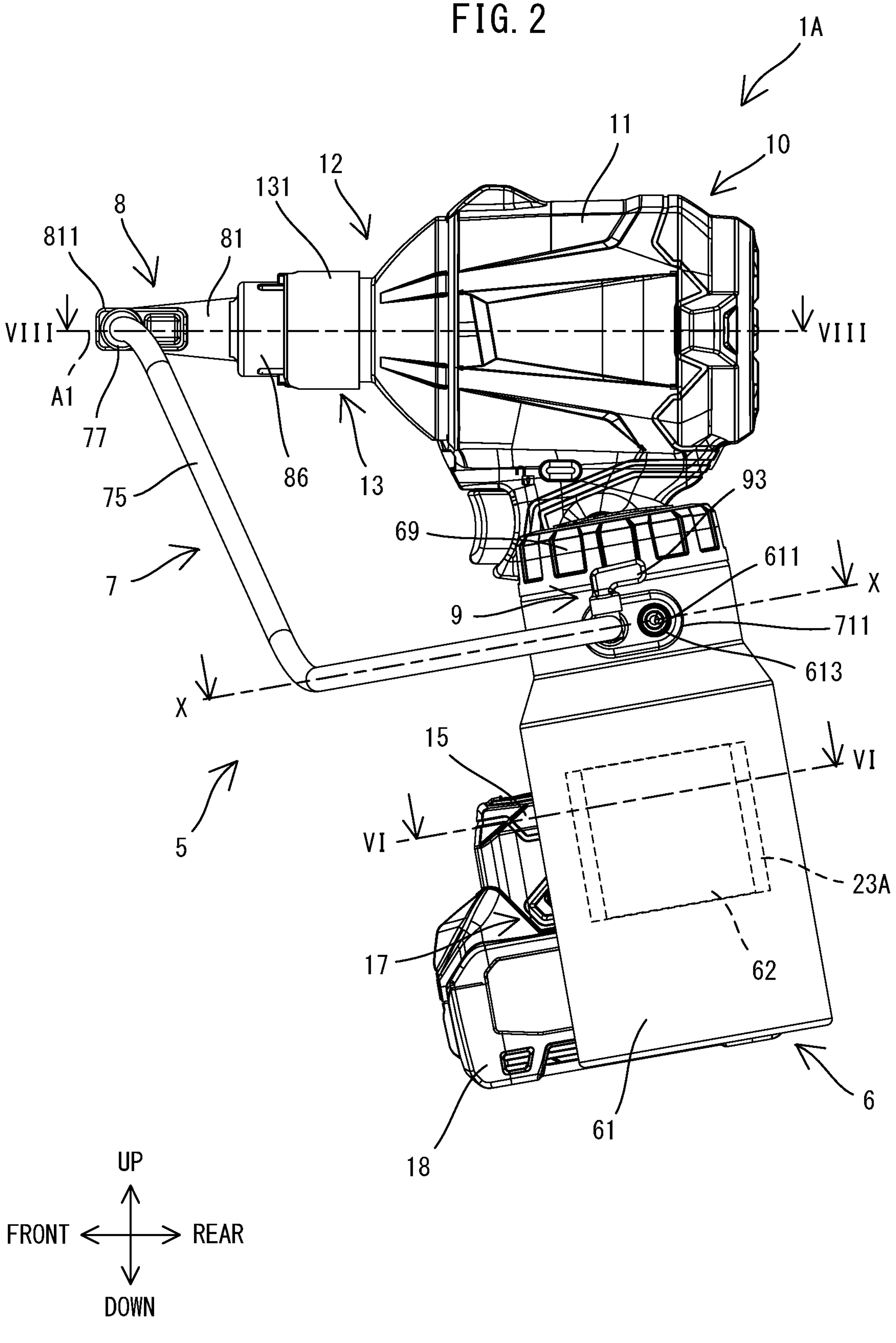
FIG. 2 is a left side view of the air duster with the sprayer attachment attached thereto.

As shown in FIGS. 1 and 2, the sprayer attachment 5 includes the container (receptacle, reservoir) 6, the nozzle 8, a liquid supply passage (liquid supply channel) 7 connected to the container 6 and the nozzle 8, and a valve 9 configured to open/close the liquid supply passage 7. The structures of these components are now described.

First, the container 6 is described. The container 6 is a hollow body configured to contain (store) a liquid (e.g., water, a chemical solution (e.g., disinfectant, insecticide, etc.) or paint). The container 6 may also be referred to as a tank. In this embodiment, the container 6 includes a bottomed tubular container body 61, which has one open end and the other closed end, and a lid (cover) 69 that is removably mounted onto the container body 61 to close the open end of the container body 61. In the following description, the bottom (closed) side of the container body 61 is defined as a lower side of the container 6, and the open side of the container body 61 is defined as an upper side of the container 6.

The container body 61 is formed by a bottom wall and a tubular peripheral wall protruding from a peripheral edge of the bottom wall and configured to store (contain) a liquid. The container body 61 is configured to be attached (mounted, coupled, connected) to the body 10 (specifically, the container-mounting part 21) of the air duster 1A via the above-described container holder 23A. More specifically, the container body 61 has the engagement part 62 configured to engage with the container holder 23A. In this embodiment, the bottom wall, the peripheral wall and the engagement part 62 are integrally formed of synthetic resin (polymeric material, plastic).

Figure 7:
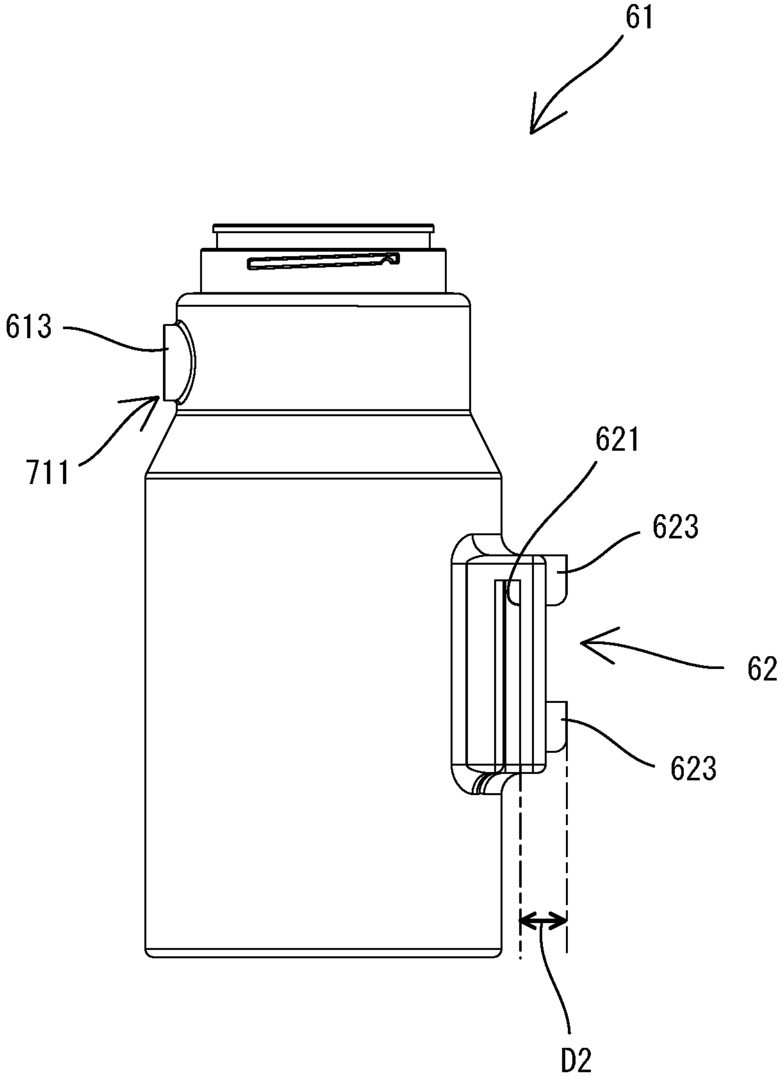
FIG. 7 is a side view of a container body.

As shown in FIGS. 6 and 7, the engagement part 62 is a protruding portion protruding outward from an outer surface of the peripheral wall of the container body 61. The engagement part 62 is generally rectangular in a side view, and has two side surfaces connected to the outer surface of the peripheral wall of the container body 61 and a rectangular surface connecting the two side surfaces and defining a protruding end surface of the engagement part 62.

An engagement groove 621 is formed in each of the two side surfaces of the engagement part 62. The engagement groove 621 extends upward from a lower end of the engagement part 62. An upper end of the engagement groove 621 is located below an upper end of the engagement part 62. In other words, the upper end of the engagement groove 621 is closed.

The engagement part 62 has three projections 623. Each of the projections 623 protrudes outward from the protruding end surface of the engagement part 62. The three projections 623 have substantially the same length of protrusion. Two of the projections 623 are disposed on an upper end portion of the engagement part 62. The two projections 623 are substantially at the same position in the up-down direction and spaced apart from each other in the lateral direction. The remaining one of the projections 623 is disposed on a lower end portion of the engagement part 62 and at a different position from the other two projections 623 in the lateral direction (specifically, between the other two projections 623).

The user can attach (mount, couple, connect) the container 6 having the above-described structure to the container holder 23A. More specifically, as shown in FIGS. 1 and 6, the user aligns the engagement grooves 621 of the container 6 with the second parts 247 of the bent parts 245 of the container holder 23A, respectively, and moves the container 6 downward from above the container holder 23A. The container 6 is moved downward relative to the container holder 23A, while the protruding ends of the projections 623 of the container 6 slide along the first face of the base part 241 and the second parts 247 of the container holder 23A slide within the corresponding engagement grooves 621 of the container 6. When the second parts 247 of the container holder 23A reach the upper ends of the corresponding engagement grooves 621 of the container 6, attachment of the container 6 to the container holder 23A (and thus to the body 10 of the air duster 1A) is completed. Further, the user can detach (remove) the container 6 from the container holder 23A (from the body 10) by moving the container 6 upward until the engagement grooves 621 are respectively disengaged from the bent parts 245.

In this manner, the user can easily attach and detach the container 6 to and from the body 10 without using a fastener or an auxiliary tool (e.g. a screw driver or a wrench/spanner).

In this embodiment, in the left-right direction, a distance D2 (see FIG. 7) between the engagement groove 621 and the protruding end of the projection 623 of the container 6 is set slightly longer than the distance D1 (see FIG. 5) between the base part 241 and the second parts 247 of the container holder 23A. The holder body 24A is a single member that is made of metal and that allows slight flexure of the bent parts 245. Therefore, when the container 6 is attached to the container holder 23A as described above, the engagement part 62 is lightly press-fitted to the container holder 23A. Thus, the container 6 is stably held without a clearance or play by the container holder 23A and thus by the body 10, with the protruding ends of the three spaced-apart projections 623 in abutment with the base part 241.

As described above, the container 6 of this embodiment is separately (discretely) formed from the body 10 of the air duster 1A, and is configured to be held by the container holder 23A fixed to the container-mounting part 21. Thus, the container holder 23A having required characteristics (e.g., required/suitable shape, strength etc.) can be separately (independently) manufactured, regardless of restrictions of the body 10 of the air duster 1A. Specifically, the container holder 23A alone can be manufactured, using a material (in this embodiment, metal) having a strength required for supporting the container 6 containing a liquid and the container holder 23A can be shaped to be engageable with the container 6. Further, the container holder 23A can be reliably integrated to the body 10 by removably fixing the container holder 23A to the body 10 with the screw 28. Thus, utilizing the container holder 23A can facilitate manufacturing and ensure the strength.

Figure 8:
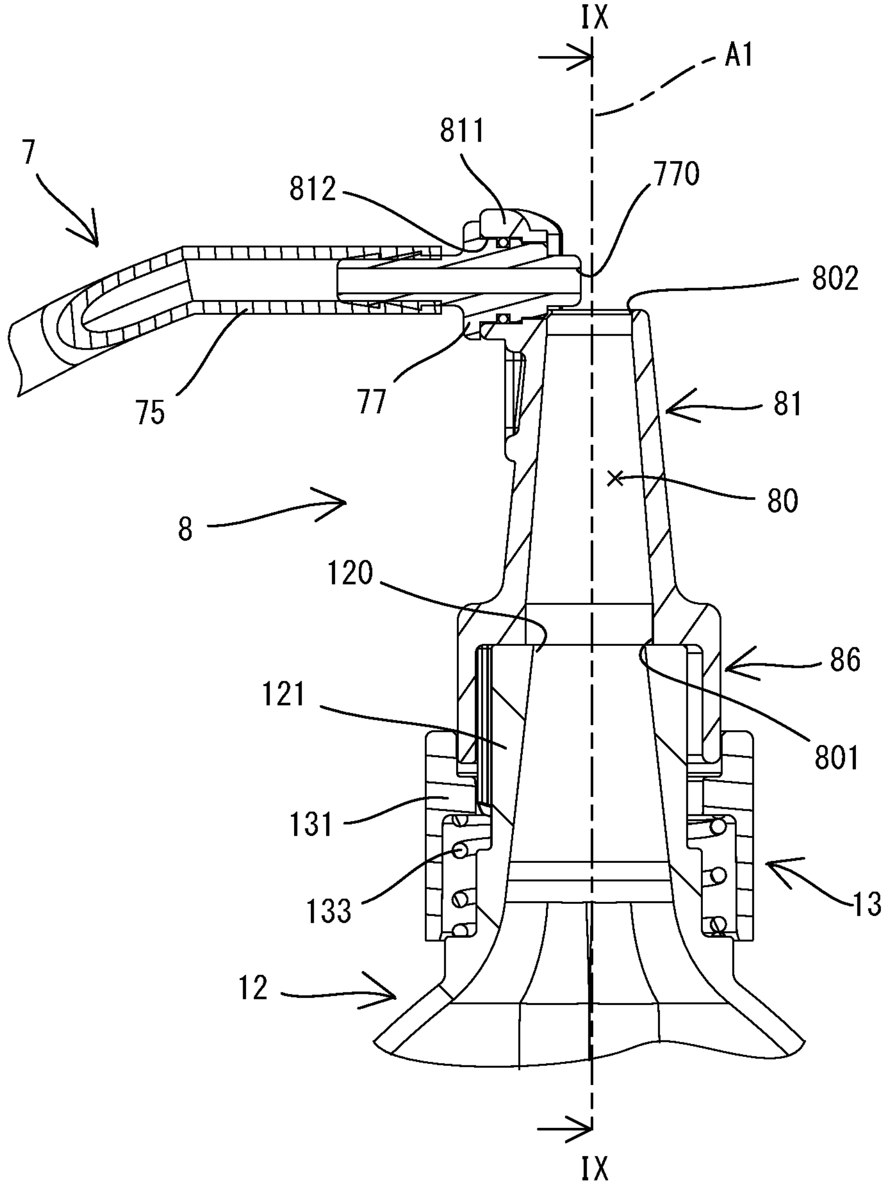
FIG. 8 is a sectional view taken along line VIII-VIII in FIG. 2.

The nozzle 8 is now described. As shown in FIGS. 1 and 8, the nozzle 8 is basically a hollow tubular member. The nozzle 8 is configured to be attached (mounted, coupled, connected) to the nozzle-mounting part 121 of the body 10 of the air duster 1A. The nozzle 8 of this embodiment includes a nozzle body 81 and a mounting part 86 that are coaxially connected to each other. The nozzle body 81 and the mounting part 86 of this embodiment are integrally formed.

The nozzle body 81 is an elongate, tubular body and defines a passage 80 extending from an opening 801 at its base end to an opening 802 at its tip end along an axis of the nozzle 8. The nozzle body 81 is configured such that the diameter of the passage 80 gradually decreases from the opening 801 to the opening 802. When the nozzle 8 is attached to the body 10 (the nozzle-mounting part 121), the passage 80 communicates with the discharge opening 120 of the body 10. Thus, compressed air discharged from the discharge opening 120 of the body 10 flows through the passage 80 and then is discharged through the opening 802. The opening 802 of the nozzle 8 is hereinafter also referred to as a discharge opening 802.

The nozzle body 81 has a holding part 811 that is configured to removably hold a nozzle connecting part 77 of the liquid supply passage 7. The holding part 811 is a protruding portion formed adjacent to the discharge opening 802 at one position on an outer periphery of the nozzle body 81. The holding part 811 protrudes forward from a front end of the nozzle body 81. The holding part 811 has a holding hole 812 formed through the holding part 811 in the radial direction of the nozzle 8. The holding hole 812 is shaped to conform to a portion of the nozzle connecting part 77 of the liquid supply passage 7.

The mounting part 86 is connected to the base end of the nozzle body 81. The mounting part 86 is configured to be attached (mounted, coupled, connected) to the body 10 of the air duster 1A. More specifically, the mounting part 86 is configured to be attached to the nozzle-mounting part 121 via the locking mechanism 13. The mounting part 86 and the locking mechanism 13 of this embodiment have substantially the same structures as the mounting part of the nozzle and the locking mechanism disclosed in US Patent Application Publication No. US 2022/0032439, an entirety of which is incorporated herein by reference. Therefore, connection between the mounting part 86 and the locking mechanism 13 of the air duster 1A is only briefly described here.

Figure 9:
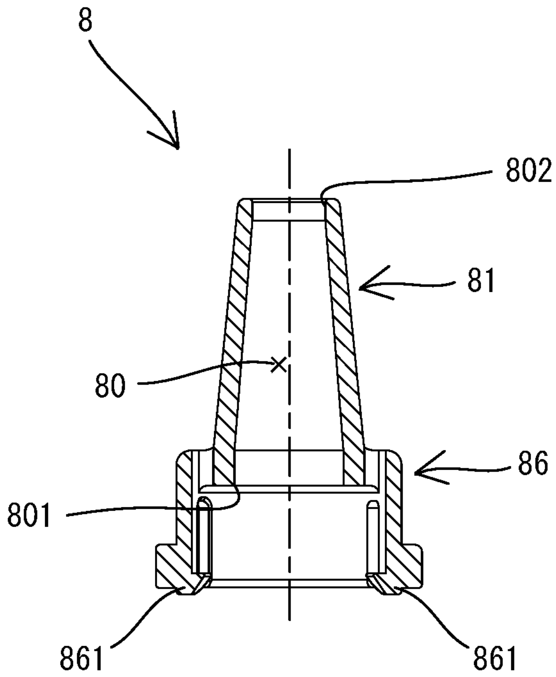
FIG. 9 is a sectional view taken along line IX-IX in FIG. 8.

As shown in FIG. 9, the mounting part 86 has two locking pieces 861. The locking pieces 861 are arranged in symmetry to the axis of the nozzle 8 and have the same structure. The locking pieces 861 extend in the axial direction and are elastically deformable (flexible) in the radial direction of the nozzle 8. An end portion of each of the locking pieces 861 has a claw (locking projection) that protrudes radially inward of the nozzle 8.

As shown in FIG. 8, the locking mechanism 13 includes a slide sleeve 131 that is movable in the font-rear direction relative to the nozzle-mounting part 121, and a biasing spring 133 that biases the slide sleeve 131 forward relative to the nozzle-mounting part 121. As shown in FIG. 3, two guide recesses 122 are formed on a front end of the nozzle-mounting part 121. The guide recesses 122 are arranged in symmetry to the axis A1. Although not shown, two locking grooves are respectively formed rearward of the two guide recesses 122 (radially inward of the slide sleeve 131). The locking grooves are configured to be respectively engaged with the claws of the locking pieces 861 of the nozzle 8. The two guide recesses 122 have the same structure, and the two locking grooves also have the same structure.

The locking mechanism 13 is actuated to lock the nozzle 8 to the nozzle-mounting part 121 in the attachment position when the user moves the nozzle 8 rearward relative to the air duster 1A. More specifically, the user moves the nozzle 8 rearward relative to the air duster 1A with the tip ends of the two locking pieces 861 respectively in alignment with the two guide recesses 122 and the locking grooves. The locking pieces 861 are guided by the guide recesses 122 to move while elastically deforming (deflecting) and move the slide sleeve 131 rearward. When the locking pieces 861 return to their initial positions and the claws on the tip ends of the locking pieces 861 engage with the locking grooves, the slide sleeve 131 is biased by the biasing spring 133 and returns forward to its initial position, thereby preventing the locking pieces 861 from being disengaged from the locking grooves. Thus, the nozzle 8 is locked in the attachment position. To "lock" herein means to block the nozzle 8 from moving forward along the axis A1.

As described above, in this embodiment, the two locking pieces 861 having the same structure, the two guide recesses 122 having the same structure and the two locking grooves having the same structure are arranged in symmetry to the axis A1 (or arranged diametrically). Owing to this arrangement, two positions located 180 degrees apart from each other around the axis A1 (opposed to each other across the axis A1) are defined as two attachment positions (first and second attachment positions) of the nozzle 8 relative to the nozzle-mounting part 121. The first attachment position is a position where the holding part 811 of the nozzle 8 is located (situated) on the left side (leftward) of the axis A1 (see FIG. 8). The second attachment position (not shown) is a position where the holding part 811 of the nozzle 8 is located (situated) on the right side (rightward) of the axis A1. The user can attach the nozzle 8 to the nozzle-mounting part 121 selectively at the first attachment position or at the second attachment position.

Further, the locking mechanism 13 unlocks the nozzle 8 when the user pivots the nozzle 8 in a specified direction around the axis A1 relative to the air duster 1A. The user can detach (remove) the nozzle 8 from the air duster 1A by pivoting the nozzle 8 to a specified position and then pulling out the nozzle 8 forward from the nozzle-mounting part 121.

Figure 10:
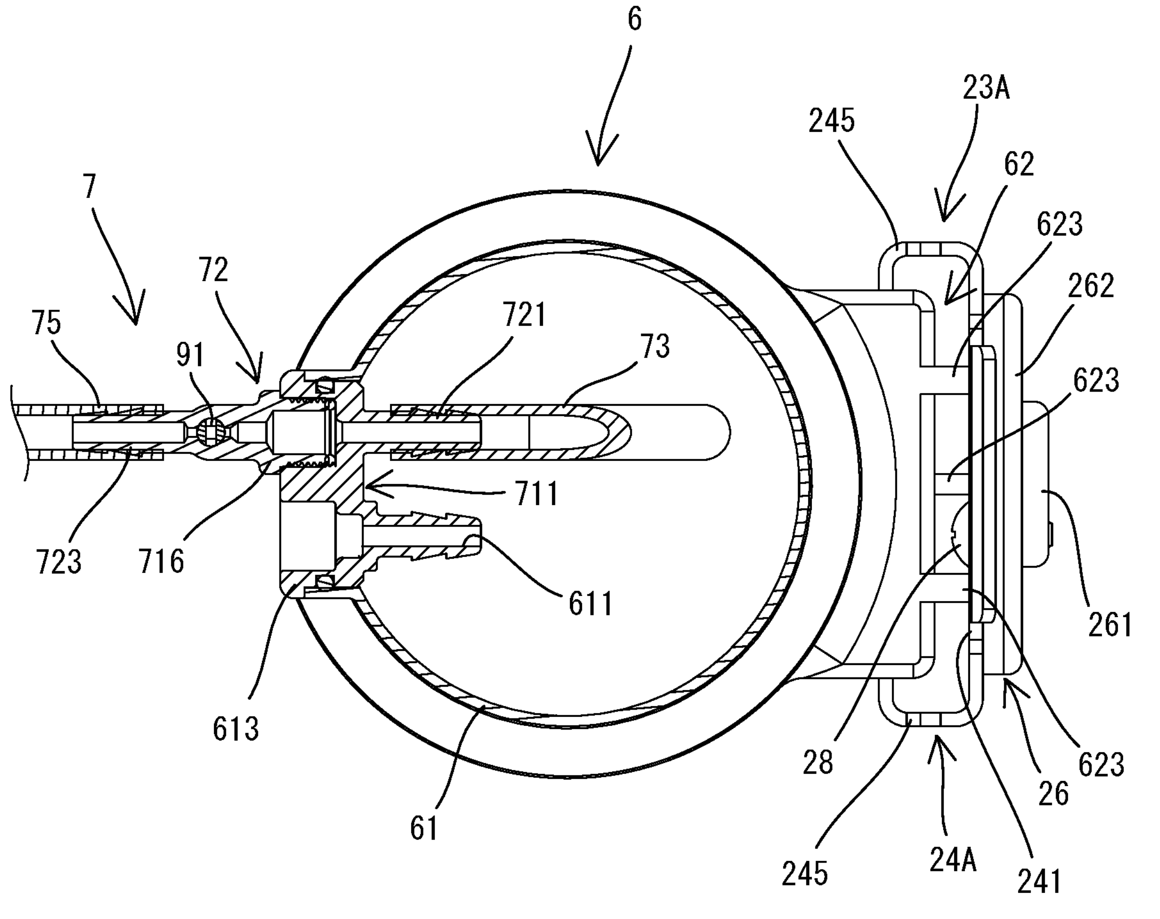
FIG. 10 is a sectional view taken along line X-X in FIG. 2 (not showing the air duster).

The liquid supply passage 7 is now described. As shown in FIGS. 1 and 10, the liquid supply passage 7 is connected to the container 6 and to the nozzle 8. The liquid supply passage 7 is configured to lead (guide, supply, convey) the liquid from the container 6 to the vicinity of the discharge opening 802 of the nozzle 8. In this embodiment, the liquid supply passage 7 is formed (defined) by an intermediate part 72, a first tube 73, a second tube 75 and the nozzle connecting part 77.

The intermediate part 72 is connected to an upper end portion of the peripheral wall of the container body 61 of the container 6. In this embodiment, the intermediate part 72 is formed by (i) a portion of a first member 711 and (ii) a second member 716. The first member 711 and the second member 716 are each made of synthetic resin (polymeric material, plastic). The first member 711 is fitted in an opening formed through the peripheral wall of the container body 61. An elastic member is fitted around an outer periphery of the first member 711 to seal a clearance between the opening of the container body 61 and the first member 711. The second member 716 is screwed and fixed to the first member 711. The intermediate part 72 has an inside protruding part 721 protruding to the inside of the container body 61 and an outside protruding part 723 protruding to the outside of the container body 61. A passage is defined inside the intermediate part 72 and extends from a protruding end of the inside protruding part 721 to a protruding end of the outside protruding part 723.

Each of the first tube 73 and the second tube 75 is a flexible tube. One end portion of the first tube 73 is connected to the protruding end portion of the inside protruding part 721. Although not shown in detail, the first tube 73 extends to a lower end portion of the container body 61 within the container body 61. A first end portion of the second tube 75 is connected to the protruding end portion of the outside protruding part 723.

As shown in FIG. 8, the nozzle connecting part 77 is a tubular member having a passage defined therein. A first end portion of the nozzle connecting part 77 is connected to a second end portion of the second tube 75. A second end portion of the nozzle connecting part 77 is removably fitted into the holding part 811 of the nozzle 8. An elastic member (so-called O-ring) is fitted around an outer periphery of the second end portion of the nozzle connecting part 77 to seal a clearance between the holding part 811 and the nozzle connecting part 77. A distal end portion of the second end portion of the nozzle connecting part 77 (i.e., a terminal end portion of the liquid supply passage 7) protrudes radially inward of the nozzle 8 from the holding part 811, to a region that is in front of a central portion of the discharge opening 802 of the nozzle 8. Thus, the terminal end portion of the liquid supply passage 7 is located at (in) a position that overlaps the discharge opening 802 of the nozzle 8 when viewed from the front of the nozzle 8. An opening at the distal end of the second end portion of the nozzle connecting part 77 functions as a liquid supply opening 770 for supplying the liquid to a flow of the air discharged (flowing out) from the discharge opening 802 of the nozzle 8.

As shown in FIG. 10, in this embodiment, the container 6 has a vent hole 611 formed adjacent to the liquid supply passage 7 (the intermediate part 72), such that the inside of the container body 61 communicates with the outside via the vent hole 611. More specifically, the vent hole 611 is formed through the first member 711 fitted in the container body 61. A portion of the vent hole 611 on the outer surface side of the container 6 has a shape that substantially conforms to (matches) the shape of the nozzle connecting part 77. Thus, the container 6 (the first member 711) has a holding part 613 that is configured to receive the nozzle connecting part 77 fitted therein.

Figure 11:
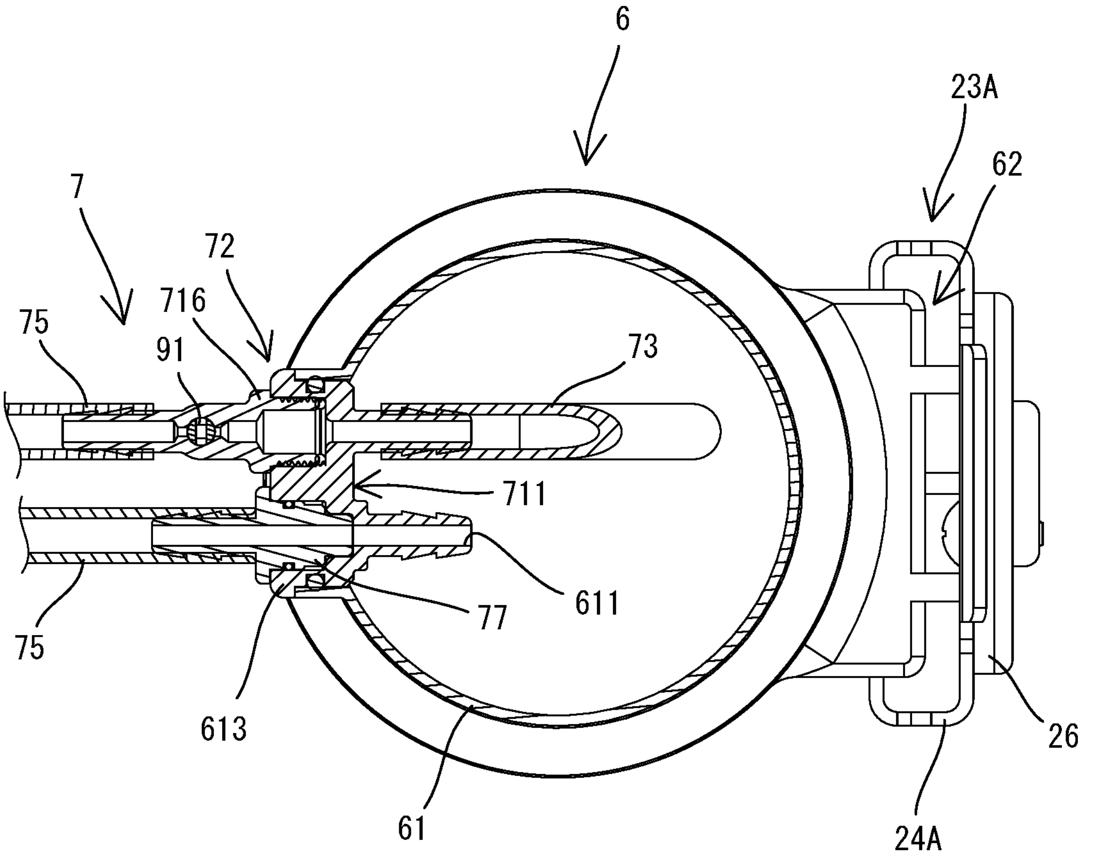
FIG. 11 is a sectional view that corresponds to FIG. 10 and that shows a nozzle connecting part connected to a holding part of a container.

As shown in FIG. 11, the user can remove the nozzle connecting part 77 from the holding part 811 of the nozzle 8 and insert the nozzle connecting part 77 into the holding part 613 of the container 6 when the user does not use the air duster 1A and the sprayer attachment 5. This arrangement can reduce the possibility that the liquid supply passage 7 (particularly, the second tube 75) becomes obstructive or the liquid supply passage 7 is caught by something when the container 6 is carried or stored. Further, the holding part 613 is configured such that the liquid supply passage 7 communicates with the vent hole 611 when the nozzle connecting part 77 is fitted in the holding part 613. This structure can prevent the liquid from spilling out of the container 6 even when the liquid remains in the second tube 75. The liquid in the second tube 75 can also be collected into the container 6 through the vent hole 611.

The valve 9 is now described. As shown in FIGS. 1 and 10, the valve 9 has an actuation part 91 and a knob 93. The actuation part 91 is disposed across the passage in the intermediate part 72 (specifically, the second member 716) and pivotably held by the intermediate part 72 (the second member 716). The knob 93 is connected to one end of the actuation part 91 and disposed on the outside of the intermediate part 72. The user can pivot (turn) the valve 9 between a closed position (shown in FIG. 10) and an open position (not shown) by manipulating the knob 93. The actuation part 91 closes the passage of the intermediate part 72 when the valve 9 is at (in) the closed position. On the other hand, the actuation part 91 opens the passage of the intermediate part 72 when the valve 9 is at (in) the open position. By pivoting the valve 9 to the open position only when spraying the liquid, the user can reduce the possibility that the liquid is unintentionally spilled from the liquid supply opening 770.

Operation of the air duster 1A when used with the sprayer attachment 5 (i.e. operation of the air duster 1A when used as a sprayer) is now described.

The user first decides whether to attach the container 6 to the left mounting part 21L or to the right mounting part 21R. The user can select either one of the container-mounting parts 21 that makes the container 6 less obstructive when mounted thereto, depending on the working space (a space around the air duster 1A during spraying). The user then attaches the container 6 to the left mounting part 21L or to the right mounting part 21R via the container holder 23A. If necessary, the user removes the container holder 23A from one of the left mounting part 21L and the right mounting part 21R and mount it to the other of them.

The user further positions the nozzle 8 and attaches the nozzle 8 to the nozzle-mounting part 121 at the first attachment position or at the second attachment position, according to the position of the container 6. If the nozzle connecting part 77 of the liquid supply passage 7 is held by the holding part 613 of the container 6, the user removes the nozzle connecting part 77 from the holding part 613 and attaches it to the holding part 811 of the nozzle 8. Thus, the container 6, the holding part 811 of the nozzle 8 and the second tube 75 of the liquid supply passage 7 are all arranged on the same side (i.e., on the left side or on the right side) relative to the body 10 of the air duster 1A in the left-right direction.

When the sprayer attachment 5 is attached to the air duster 1A as described above, the body 10 of the air duster 1A can be carried integrally with the sprayer attachment 5. The user simply needs to hold the body 10 of the air duster 1A when using the air duster 1A as the sprayer. Thus, the air duster 1A in this embodiment is easy to handle even when the sprayer attachment 5 is attached thereto. Particularly, as described above, the container 6 can be attached selectively to one of the two attachment positions according to the working space. In addition, the nozzle 8 can also be attached selectively to one of the two attachment positions according to the working space. Therefore, the air duster 1A achieves excellent maneuverability with the sprayer attachment 5 attached thereto.

When the user holds the grip part 14 and manually depresses the trigger 141, the motor 31 is driven and the fan 33 is rotated. When the fan 33 is rotated, the air is sucked into the housing part 11 through the inlet openings 110. The air passes the fan 33 and is compressed, and the compressed air passes through the discharge opening 120 and the passage 80 of the nozzle 8 and is discharged from the discharge opening 802 of the nozzle 8. The distal end portion of the nozzle connecting part 77 (the terminal end portion of the liquid supply passage 7) is disposed in front of the discharge opening 802 within the flow of the air discharged from the discharge opening 802. The air discharged from the discharge opening 802 flows at the highest speed in the vicinity of its central portion of the discharge opening 802 (i.e., in the vicinity of the axis A1). Therefore, the air pressure decreases in the vicinity of the liquid supply opening 770, so that the liquid within the container 6 is sucked up through the liquid supply passage 7 and atomized and sprayed.

Second Embodiment

An air duster 1B and the sprayer attachment 5 according to a second embodiment are now described with reference to FIGS. 12 to 16.

Figure 12:
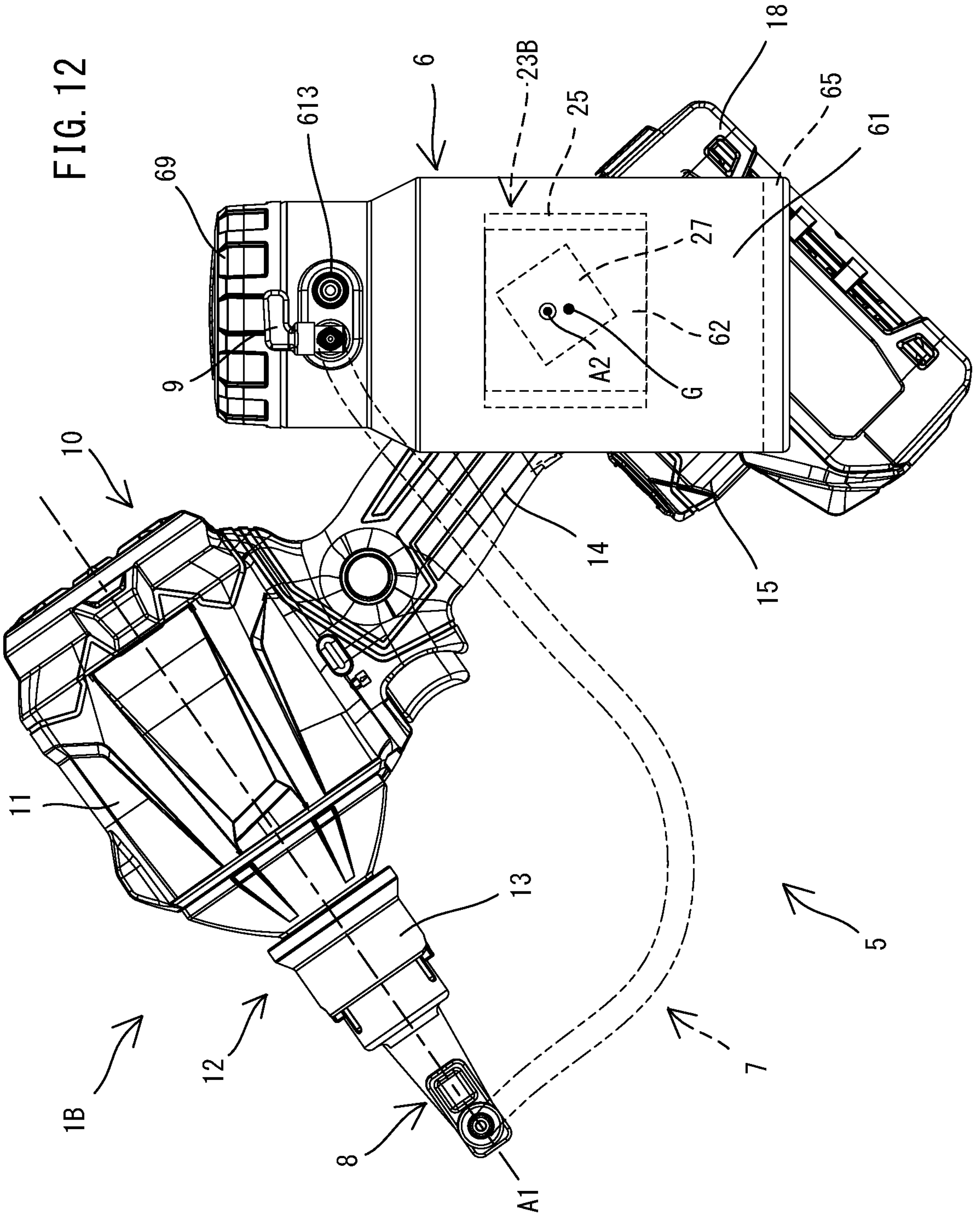
FIG. 12 is a left side view of another air duster with the sprayer attachment attached thereto.
Figure 13:
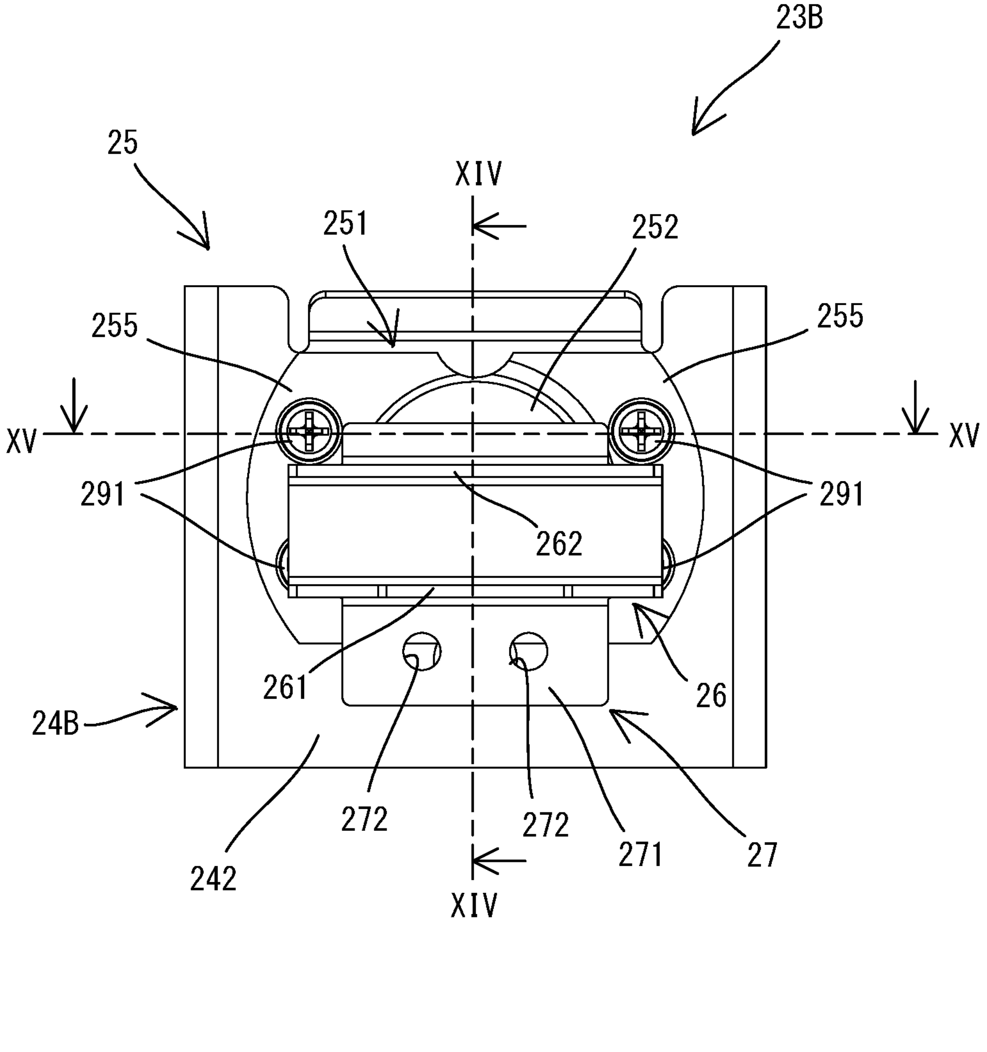
FIG. 13 shows a container holder as viewed from an engagement part side.
Figure 14:
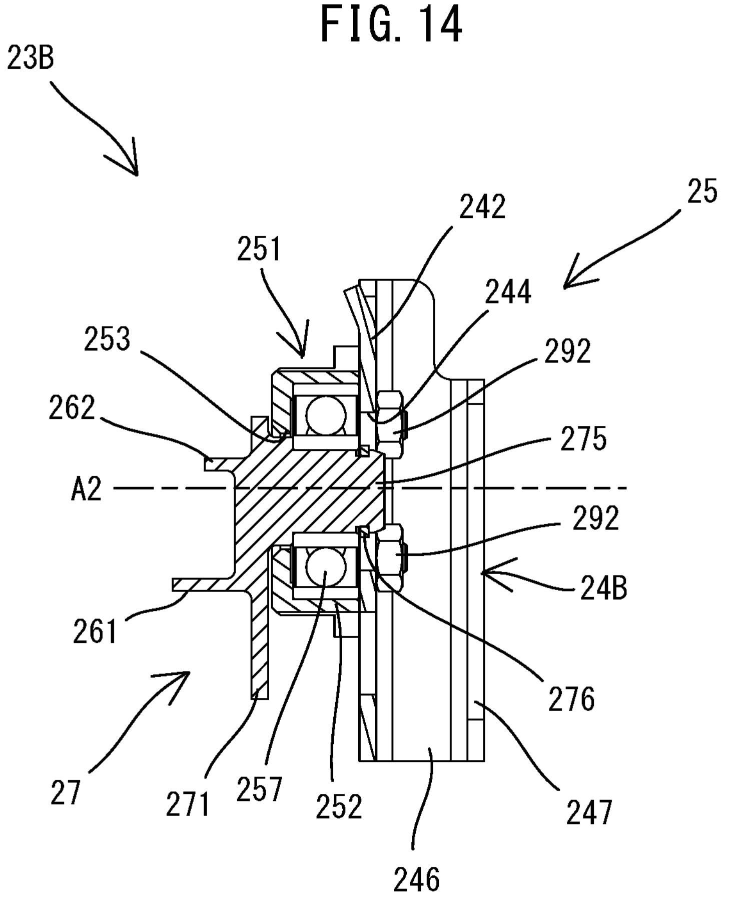
FIG. 14 is a sectional view taken along line XIV-XIV in FIG. 13.
Figure 15:
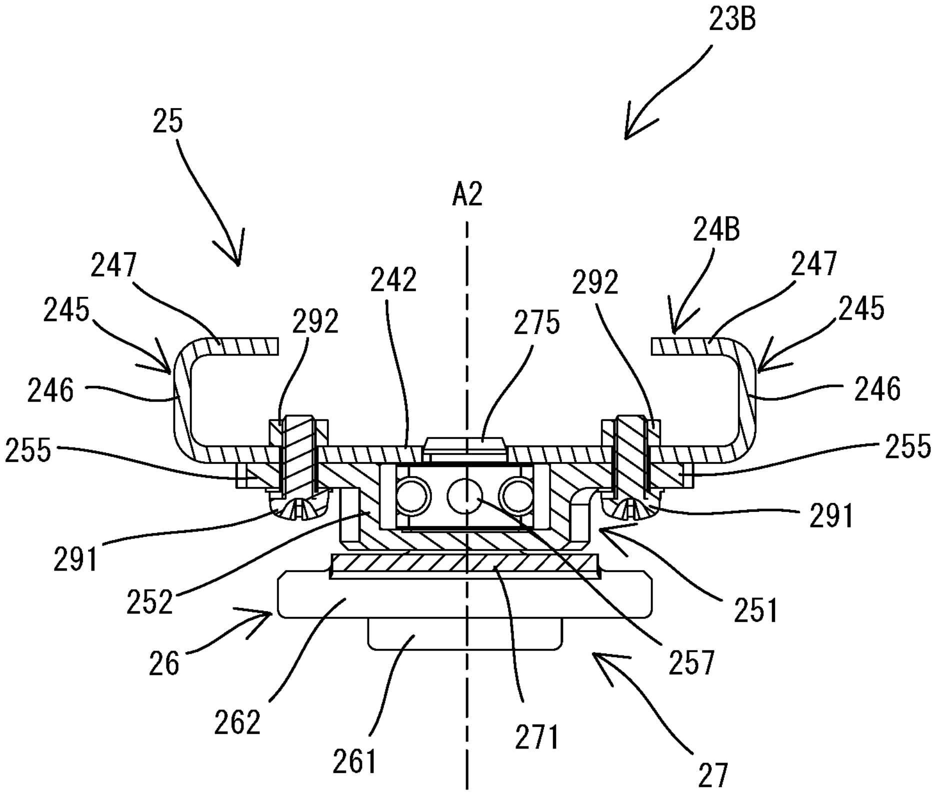
FIG. 15 is a sectional view taken along line XV-XV in FIG. 13.
Figure 16:
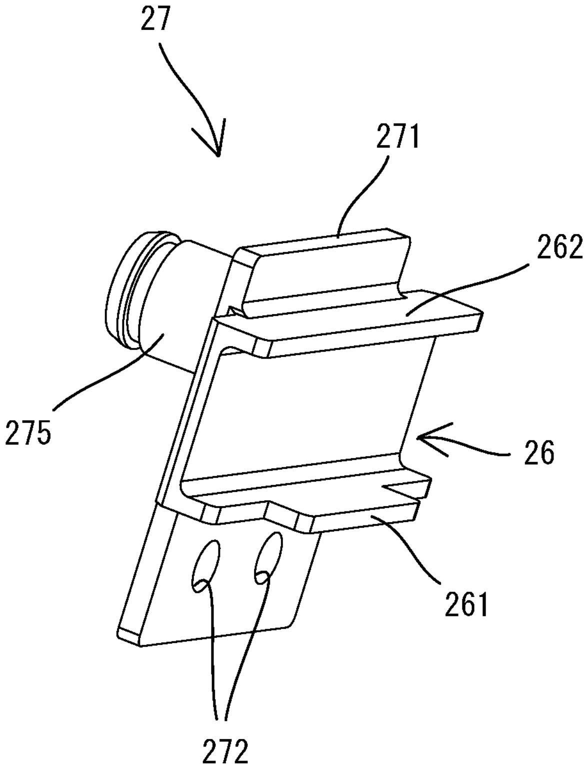
FIG. 16 is a perspective view of a fixed part of the container holder.

As shown in FIG. 12, the air duster 1B of the second embodiment has a container holder 23B removably fixed to one of the two container-mounting parts 21 of the body 10. The air duster 1B has substantially the same structure as the air duster 1A of the first embodiment, except for the container holder 23B. Further, in this embodiment, the sprayer attachment 5 is substantially the same with that described in the first embodiment. Therefore, in the following description, components that are substantially identical to those of the air duster 1A and the sprayer attachment 5 are given the same numerals as in the first embodiment and are not described or only briefly described, and a different structure is mainly described.

As shown in FIGS. 13 to 16, the container holder 23B includes a fixed part 27 and a movable part 25 that is supported by the fixed part 27 to be rotatable (pivotable) relative to the fixed part 27.

The fixed part 27 includes an engagement part 26, a base part 271 and a support shaft 275. Like in the first embodiment, the engagement part 26 has a lower end portion 261 configured to be fitted in the locking groove 213 of the container-mounting part 21, and an upper end portion 262 configured to abut on the side wall of the controller-housing part 15. The base part 271 is a generally rectangular plate-like member. The engagement part 26 is arranged to cross (intersect) a substantially central portion of the base part 271 and inseparably fixed to a first face of the base part 271. Through holes 272 for the screw 28 are formed in a portion of the base part 271 that protrudes downward of the engagement part 26. The support shaft 275 is shaped like a solid cylinder. The support shaft 275 is inseparably fixed to an upper end portion of the base part 271 so as to protrude from a second face, which is the opposite face of the base part 271. Like the engagement part 26, the base part 271 and the support shaft 275 are made of metal (e.g. iron alloy or aluminum alloy).

The movable part 25 includes a holder body 24B, a bearing holding part 251 and a bearing 257. The holder body 24B includes a base part 242 and bent parts 245. The base part 242 is a plate-like portion having substantially the same shape (i.e., the rectangular shape) as the base part 241 of the first embodiment, but does not have the through holes 243 (see FIG. 3) for the screw 28. The base part 242 has a through hole 244 formed through its substantially central portion. The diameter of the through hole 244 is larger than the diameter of the support shaft 275 of the fixed part 27. The bearing holding part 251 includes a hollow cylindrical part 252 and two connecting parts 255. The cylindrical part

252 has a circular bottom wall having a through hole 253, and a cylindrical peripheral wall protruding from a peripheral edge of the bottom wall. An outer ring of the bearing (specifically, ball bearing) 257 is press-fitted into the peripheral wall of the cylindrical part 252. The connecting parts 255 each protrude from an opening end of the peripheral wall of the cylindrical part 252 such that the connecting parts 255 extend away from each other.

Each of the connecting parts 255 is fixed to the holder body 24B with two bolts 291 and two nuts 292. Thus, the holder body 24B, the bearing holding part 251 and the bearing 257 are integrated to form the movable part 25. The holder body 24B and the bearing holding part 251 are also made of metal (e.g. iron alloy or aluminum alloy).

The support shaft 275 of the fixed part 27 is inserted through the through hole 253 of the bottom wall of the cylindrical part 252 and fitted through an inner ring of the bearing 257 within the cylindrical part 252. A distal end portion of the support shaft 275 is inserted through the through hole 244 of the base part 242 of the holder body 24B. An annular groove is formed around the distal end portion of the support shaft 275, and a retaining ring 276 (a so-called snap ring or circlip) is engaged with the annular groove. The retaining ring 276 prevents the movable part 25 from coming off the support shaft 275 (the fixed part 27).

Owing to the above-described structure, the movable part 25 is rotatable (pivotable) around an axis A2 of the support shaft 275 relative to the fixed part 27.

Although not shown in detail, in this embodiment, the fixed part 27 of the container holder 23B is mounted selectively to the left mounting part 21L or to the right mounting part 21R. More specifically, like the container holder 23A (see FIG. 5) of the first embodiment, the central portion of the lower end portion 261 of the engagement part 26 is fitted in the locking groove 213, and the screw 28 is inserted through one of the through holes 272 of the base part 271 and screwed into the threaded hole 211. Thus, the fixed part 27 is fixed to the body 10. As a result, the movable part 25 becomes rotatable (pivotable) relative to the air duster 1B around the axis A2 of the support shaft 275. The axis A2 of the support shaft 275 (i.e., a rotational axis (pivot axis) A2 of the movable part 25) extends substantially in the left-right direction relative to the body 10.

Operation of the air duster 1B used with the sprayer attachment 5 (i.e., operation of the air duster 1B when used as a sprayer) is now described.

A user mounts the container 6 selectively to the left mounting part 21L or to the right mounting part 21R via the container holder 23B. The user also attaches the nozzle 8 to the nozzle-mounting part 12 at the first attachment position or at the second attachment position, and connects the nozzle connecting part 77 to the nozzle 8. These procedures are the same as described in the first embodiment. Thus, in this embodiment, when the sprayer attachment 5 is attached to the air duster 1B, the body 10 of the air duster 1B can also be carried integrally with the sprayer attachment 5. Further, when the motor 31 is driven, the liquid within the container 6 is sucked up through the liquid supply passage 7 and atomized and sprayed by a flow of air discharged from the discharge opening 802 of the nozzle 8.

As described above, in this embodiment, the container holder 23B includes the fixed part 27 that is fixed to the body 10 (the container-mounting part 21) of the air duster 1B with the screw 28, and the movable part 25 that is rotatably (pivotably) connected (coupled) to the fixed part 27. Thus, the orientation (attitude) of the container 6 relative to the air duster 1B can be changed according to the orientation (attitude) of the air duster 1B during spraying. For example, as shown in FIG. 12, the user may hold the grip part 14 and direct the tip end (distal end) of the nozzle 8 downward (or upward) relative to the horizontal direction (the direction that is orthogonal to the direction of gravity). In other words, the user may position the air duster 1B such that the axis A1 is inclined downward (or upward) toward the front relative to the horizontal direction. Even in such a case, the rotational axis A2 of the movable part 25 can be usually maintained to extend substantially in the horizontal direction. Therefore, the container 6 held by the movable part 25 can be maintained in an orientation (attitude) such that the up-down direction of the container 6 coincides with the direction of gravity, owing to the weight of the container 6 as a whole (i.e., a total of the weight of the container 6 and the weight of the liquid stored within the container 6), and only the orientation (attitude) of the air duster 1B is changed.

In the up-down direction of the container 6, the rotational axis A2 is above the center of gravity G of the entirety of the container 6 with a maximum allowable amount of liquid stored therein, in order to maintain the orientation of the container 6 relative to the direction of gravity irrespective of the orientation of the air duster 1B. In this embodiment, the rotational axis A2 can be arranged within a limited region of the container 6, due to arrangement of the container 6 relative to the air duster 1B (the body 10). Therefore, a metal weight (supplemental weight) 65 is embedded in a bottom of the plastic container body 61. The center of gravity G can be lowered by provision of the weight 65, as compared with a case where the weight 65 is not provided. Therefore, even if there is a constraint in the arrangement of the rotational axis A2, the container 6 and the movable part 25 can be made rotatable (pivotable) relative to the fixed part 27 and the air duster 1B by arranging the rotational axis A2 above the center of gravity G and utilizing the weight (mass) of the entirety of the container 6. The weight 65 may be made of a material other than metal insofar as it has a higher specific gravity than the container body 61. Further, the weight 65 may be omitted insofar as the rotational axis A2 can be arranged above the center of gravity G.

As described above, the container holder 23B of this embodiment enables changing only the orientation of the air duster 1B without changing the orientation of the container 6 relative to the horizontal direction and the direction of gravity. Therefore, the possibility that the liquid spills from the container 6 can be reduced. Particularly, the movable part 25 is rotatably (pivotably) connected (coupled) to the fixed part 27 via the bearing 257, the orientation of the container 6 relative to the air duster 1B can be easily and smoothly changed when the user changes the orientation of the air duster 1B relative to the horizontal direction.

Correspondences between the features of the above-described embodiments and the features of the present disclosure are as follows. It is noted, however, that the features of the above-described embodiments are merely exemplary and do not limit the features of the present disclosure.

Each of the air duster 1A, 1B is an example of an "electric blower". The body 10 is an example of a "body". The sprayer attachment 5 is an example of a "sprayer attachment". The container 6 is an example of a "container". The nozzle 8 and the discharge opening 802 (the opening 802) are examples of a "nozzle" and a "discharge opening", respectively. The liquid supply passage 7 is an example of a "liquid supply passage". The container-mounting part 21 is an example of a "container-mounting part". The nozzle-mounting part 121 is an example of a "nozzle-mounting part". The grip part 14 is an example of a "grip part". The motor 31 and the fan 33 are examples of a "motor" and a "fan", respectively. The housing part 11 is an example of a "housing part". The battery-mounting part 17 is an example of a "battery-mounting part". Each of the container holder 23A, 23B is an example of a "holder". The fixed part 27 and the movable part 25 of the container holder 23B are examples of a "fixed part" and a "movable part", respectively. The valve 9 is an example of a "valve". The nozzle connecting part 77 is an example of a "connecting part". The holding part 613 is an example of a "holding part". The vent hole 611 is an example of a "vent hole".

The above-described embodiments are merely exemplary, and an electric blower and a sprayer attachment according to the present disclosure are not limited to the air dusters 1A, 1B and the sprayer attachment 5 of the above-described embodiments. For example, the following non-limiting modifications may be made. Further, at least one of these modifications may be employed in combination with at least one of the air dusters 1A, 1B, the sprayer attachment 5 or the claimed features.

The structure (shape, components, connection between the components) of the body 10 of the air duster 1A, 1B is not limited to those of the above-described embodiments, and may be appropriately changed. For example, the shape and arrangement of the inlet openings 110 and the discharge opening 120 may be appropriately changed. The grip part 14 may extend in a direction that is orthogonal to the axis A1, or the grip part 14 may be connected to the rear end of the housing part 11 and extend rearward. The controller-housing part 15 may be omitted and the battery-mounting part 17 may be directly connected to the lower end of the grip part 14. In such a modification, the controller 37 may be disposed elsewhere (for example, in the housing part 11). Further, for example, a power source of the air duster 1A, 1B is not limited to the rechargeable battery 18, and may be a disposable battery. A rechargeable battery may be incorporated in the air duster 1A, 1B. Alternatively, the air duster 1A, 1B may be powered from an external AC power source.

The motor 31 may be a motor with a brush, or may be an AC motor. A plurality of fans 33 may be employed. In other words, the air duster 1A, 1B may be configured as a multi-stage centrifugal blower. The fan 33 may be fixed to the output shaft 311 of the motor 31 between the stator of the motor 31 and the discharge opening 120. The fan 33 is preferably a centrifugal fan (particularly, a backward curved fan (also called as a turbo fan)), but may be a mixed flow fan, for example. In place of the fan 33, the air duster 1A, 1B may include a compressing mechanism that is configured to be driven by the motor 31 to compress air by using a piston.

The following examples of non-limiting modifications may be made to the container-mounting part 21 and/or the container holder 23A, 23B.

The body 10 may have only one container-mounting part 21. Alternatively, the body 10 may have three or more container-mounting parts 21. The position of the container-mounting part 21 is not limited to the side portion of the battery-mounting part 17, but may be changed to any position on the body 10. For example, the container-mounting part 21 may be disposed on the housing part 11.

The container holder 23A, 23B may be fixed to the container-mounting part 21 in any manner other than by engagement between the lower end portion 261 of the engagement part 26 and the locking groove 213 and fixing with the screw 28. For example, a projection(s) provided on the container-mounting part 21 may be fitted into a recess (es) provided on the container holder 23A, 23B. Alternatively, a rail(s) or a groove(s) provided on the container-mounting part 21 may be engaged with a matching groove(s) or a matching rail(s) provided on the container holder 23A, 23B by sliding. Further, a locking member may be provided to hold the container holder 23A, 23B in a specified position.

The structure for supporting the movable part 25 by the fixed part 27 may be appropriately changed, insofar as the movable part 25 is movable relative to the fixed part 27. The movable part 25 may be supported by the fixed part 27 to be rotatable (pivotable) relative to the fixed part 27 without the bearing 257. The movable part 25 may be linearly movable relative to the fixed part 27. The position of the movable part 25 relative to the fixed part 27 may be changed selectively to any of multiple positions in response to manipulation of a user on the movable part 25.

In the above-described embodiments, the container 6 is attached (mounted, coupled, connected) to the body 10 via the container holder 23A, 23B, which is removably fixed to the container-mounting part 21. The container holder 23A, 23B may, however, be fixed to the body 10 to be unremovable from the body 10 and form a portion of the container-mounting part 21. Alternatively, the container-mounting part 21 may have a pair of rails for sliding engagement with the pair of engagement grooves 621 of the engagement part 62 of the container 6. In these modifications, the container 6 can be directly attached (mounted, coupled, connected) to the container-mounting part 21.

Connection between the container 6 and the container holder 23A, 23B or connection between the container 6 and the container-mounting part 21 may also be appropriately changed. For example, the container holder 23A, 23B or the container-mounting part 21 may have a recess in which the bottom of the container body 61 can be fitted. Alternatively, the container holder 23A, 23B or the container-mounting part 21 may have an annular (loop-shaped, ring-shaped) portion that is configured to be disposed around the container body 61 to hold the container body 61. The container 6 may be attached to the container holder 23A, 23B or to the container-mounting part 21 by using a fastener such as a screw.

The following examples of non-limiting modifications may be made to the sprayer attachment 5.

The shape and size of the container body 61 and/or the lid 69 and/or connection between the container body 61 and the lid 69 may be appropriately changed, insofar as the container 6 can store a liquid. The engagement structure (the engagement part 62) between the container 6 and the air duster 1A, 1B may be changed according to the above-described change of the container holder 23A, 23B and/or of the container-mounting part 21.

The shape and size of the nozzle 8 and connection between the nozzle 8 and the body 10 may be appropriately changed, insofar as the nozzle 8 can discharge air through the discharge opening 802 when attached to the body 10 (the nozzle-mounting part 121) of the air duster 1A, 1B. For example, the nozzle 8 need not be attached to the body 10 via the locking mechanism 13. For example, the nozzle 8 may be configured such that a female thread formed on an inner periphery of a base end portion of the nozzle 8 is engaged with a male thread formed on an outer periphery of the body 10 (the nozzle-mounting part 121). Alternatively, the nozzle 8 may be attached to the body 10 by using a fastener such as a screw.

Components that define the liquid supply passage 7, connection between the components and connection between the liquid supply passage 7 and the container 6 or the nozzle 8 may be appropriately changed insofar as the liquid supply passage 7 can lead the liquid from the container 6 to the vicinity of the discharge opening 802 of the nozzle 8. For example, the liquid supply passage 7 may be formed (defined) by a single tube (pipe) (e.g., a single flexible tube). For example, a first end portion of the single tube may be disposed within the container 6 and a second end portion of the single tube may be connected to the nozzle 8. The tube (pipe) may be removable or unremovable from the container 6 and/or the nozzle 8.

The position of the liquid supply opening 770 relative to the nozzle 8 may be changed in the vicinity of the discharge opening 802 of the nozzle 8. For example, the liquid supply opening 770 may be arranged substantially in the same position as the edge of the discharge opening 802. In order to efficiently suck up liquid, however, it may be preferable that the terminal end portion (the end having the liquid supply opening 770) of the liquid supply passage 7 is within the flow of air that is discharged from the discharge opening 802 in response to driving of the motor 31. In other words, it may be preferable that the terminal end portion of the liquid supply passage 7 overlaps the discharge opening 802 of the nozzle 8 when viewed from the front of the nozzle 8. It may be more preferable that the liquid supply opening 770 is directly in front of the central portion of the discharge opening 802 like in the above-described embodiments.

The valve 9 may be disposed at a position that is different from that described in the embodiments in the liquid supply passage 7. Alternatively, the valve 9 may be omitted.

Further, in view of the nature of the present disclosure, the above-described embodiments and the modifications thereto, the following aspects are provided. At least one of the following aspects can be employed in combination with at least one of the above-described embodiments, the modifications or the claimed features.

(Aspect 1)

The body has a first opening, through which air is sucked into the body, and a second opening through which the air is discharged (exits) from the body, and the nozzle-mounting part is disposed around the second opening of the body.

The inlet opening 110 of the body 10 and the discharge opening 120 are examples of a "first opening" and a "second opening" in this aspect, respectively.

(Aspect 2)

The blower further includes:

- a motor having an output shaft that is rotatable around a first axis; and
- a fan configured to be rotated integrally with the output shaft such that the air is discharged from the discharge opening of the nozzle attached to the body, and the nozzle-mounting part is provided along the first axis.

(Aspect 3)

The at least one container-mounting part includes a plurality of container-mounting parts, and the holder is removably fixed selectively to one of the container-mounting parts.

(Aspect 4)

The holder is made of metal and removably fixed to the body with a screw.

(Aspect 5)

The holder has (i) a first protruding part configured to engage with a first recess formed on the body, or (ii) a second recess configured to engage with a second protruding part formed on the body.

The locking groove 213 of the body 10 is an example of a "first recess" in this aspect. The lower end portion 261 of the engagement part 26 of the container holder 23A, 23B is an example of the "first protruding part" in this aspect.

(Aspect 6)

The nozzle-mounting part is provided along a first axis, the body includes a grip part configured to be held by a user and extending along a second axis crossing the first axis, and a rotational axis of the movable part of the holder extends in a direction orthogonal to the first and second axes.

(Aspect 7)

The movable part is rotatably supported by the fixed part via a bearing.

(Aspect 8)

The sprayer attachment is configured such that when the blower is driven, the liquid is sucked up from the container through the liquid supply passage by a flow of air discharged from the discharge opening of the nozzle attached to the body.

(Aspect 9)

A terminal end portion of the liquid supply passage is in a vicinity of the discharge opening of the nozzle.

(Aspect 10)

The liquid supply passage is configured such that the terminal end portion is within the flow of air discharged from the discharge opening of the nozzle when the blower is driven.

(Aspect 11)

At least a portion of the liquid supply passage is formed (defined) by a flexible tube.

(Aspect 12)

The connecting part is fixed to one end of the flexible tube.

(Aspect 13)

The container is configured to removably engage with the container-mounting part or with the holder.

(Aspect 14)

The container is configured to engage with the container-mounting part or with the holder by sliding.

(Aspect 15)

A rotational axis of the movable part of the holder is located above a center of gravity of the container filled up with the liquid, in an up-down direction of the container.

(Aspect 16)

A metal weight (supplemental weight) is provided in a bottom of the container.

DESCRIPTION OF THE REFERENCE NUMERALS

1A, 1B: air duster, 10: body, 11: housing part, 110: inlet opening, 12: nozzle part, 120: discharge opening, 121: nozzle-mounting part, 122: guide recess, 13: locking mechanism, 131: slide sleeve, 133: biasing spring, 14: grip part, 141: trigger, 15: controller-housing part, 17: battery-mounting part, 18: battery, 171: side wall, 171L: left wall, 171R: right wall, 172: rail, 181: groove, 21: container-mounting part, 211: threaded hole, 213: locking groove, 21L: left mounting part, 21R: right mounting part, 23A, 23B: container holder, 24A, 24B: holder body, 241: base part, 242: base part, 243: through hole, 244: through hole, 245: bent part, 246: first part, 247: second part, 25: movable part, 251: bearing holding part, 252: cylindrical part, 253: through hole, 255: connecting part, 257: bearing, 26: engagement part, 261: lower end portion, 262: upper end portion, 27: fixed part, 271: base part, 272: through hole, 275: support shaft, 276: retaining ring, 28: screw, 291: bolt, 292: nut, 31: motor, 311: output shaft, 33: fan, 37: controller, 5: sprayer attachment, 6: container, 61: container body, 611: vent hole, 613: holding part, 62: engagement part, 621: engagement groove, 623: projection, 69: lid, 7: liquid supply passage, 711: first member, 716: second member, 72: intermediate part, 721: inside protruding part, 723: outside protruding part, 73: first tube, 75: second tube, 77: nozzle connecting part, 770: liquid supply opening, 8: nozzle, 80: passage, 801: opening, 802: opening (discharge opening), 81: nozzle body, 811: holding part, 812: holding hole, 86: mounting part, 861: locking piece, 9: valve, 91: actuation part, 93: knob

What is claimed is:

1. An electric blower configured to blow air, comprising:

a body configured such that a sprayer attachment is attachable to the body, the sprayer attachment including a container configured to store a liquid, a nozzle having a discharge opening, and a liquid supply passage connected to the container and the nozzle and configured to transport the liquid from the container to the nozzle;

a motor; and a fan configured to be rotated by the motor and to blow air from the discharge opening of the nozzle when the sprayer attachment is attached to the body, wherein:

the body includes:

a housing part (i) that houses the motor and the fan, (ii) extending along a rotation axis of the motor and the fan that defines a front-rear direction of the blower, and (iii) having a nozzle-mounting part to which the nozzle is attachable at a front end of the housing part in the front-rear direction;

a grip part (i) configured to be held by a user, (ii) protruding from the housing part generally in an up-down direction of the blower that is perpendicular to the front-rear direction and (iii) having an upper end connected to the housing part and a lower free end spaced from the housing part in the up-down direction; and a battery-mounting part (i) connected to the lower free end of the grip part, (ii) spaced from the housing part, (iii) configured to removably receive a battery for supplying power to the motor, and (iv) having at least one container-mounting part to which the container is attachable;

the container has (i) a container longitudinal axis, (ii) a first closed axial end and (iii) a second open axial end; and the at least one container-mounting part is configured to removably receive the container such that, when the container is attached to the at least one container-mounting part, the container longitudinal axis is generally in the up-down direction and the second open axial end is directed upward in the up-down direction.

2. The blower as defined in claim 1, wherein the at least one container-mounting part includes a plurality of container-mounting parts at different positions on the battery-mounting part.

3. The blower as defined in claim 2, wherein:

the nozzle-mounting part has a nozzle-mounting part longitudinal axis;

the grip part has a grip part longitudinal axis;

the plurality of container-mounting parts include two container-mounting parts on both sides of a plane containing the nozzle-mounting part longitudinal axis and the grip part longitudinal axis; and the nozzle-mounting part is configured such that the nozzle is selectively attachable to either one of two nozzle attachment positions that are different in a circumferential direction around the nozzle-mounting part longitudinal axis.

4. The blower as defined in claim 3, further comprising:

a holder (i) configured to removably hold the container and (ii) that is a separate component from the body, wherein:

the holder is selectively removably fixed to one of the two container-mounting parts, and each of the two container-mounting parts is configured to removably receive the container via the holder.

5. The blower as defined in claim 1, further comprising:

wherein the at least one container-mounting part is on a side portion of the battery-mounting part.

6. The blower as defined in claim 1, further comprising:

a holder (i) configured to removably hold the container and and (ii) that is a separate component from the body, wherein:

the holder is removably fixed to the at least one container-mounting part, and the at least one container-mounting part is configured to removably receive the container via the holder.

7. The blower as defined in claim 6, wherein the holder includes:

a fixed part removably fixed to the at least one container-mounting part; and a movable part configured to removably hold the container and connected to the fixed part to be movable relative to the fixed part.

8. The blower as defined in claim 7, wherein the movable part is rotatably connected to the fixed part.

9. The blower as defined in claim 1, further comprising the sprayer attachment, wherein:

the container is attached to the at least one container-mounting part; and the nozzle is attached to the nozzle-mounting part.

10. The blower as defined in claim 9, wherein the container is configured to be attached to and detached from the at least one container-mounting part without need for using an auxiliary tool.

11. The blower as defined in claim 9, wherein the sprayer attachment further includes a valve configured to open and close the liquid supply passage in response to manipulation of the valve by a user.

12. The blower as defined in claim 9, wherein one end portion of the liquid supply passage has a connecting part configured to be removably connected to the nozzle.

13. The blower as defined in claim 12, wherein the container has a holding part configured to removably hold the connecting part of the liquid supply passage.

14. The blower as defined in claim 13, wherein:

the container has a vent hole communicatively connecting an inside of the container to an outside of the container, and the holding part defines at least a portion of the vent hole of the container and is configured to receive the connecting part fitted therein.

15. An electric blower and sprayer assembly, comprising:

an electric blower (i) configured to blow air and (ii) including a body, a motor and a fan configured to be rotated by the motor; and a sprayer attachment (a) attached to the body and (b) including a container (i) configured to store a liquid and (ii) having a container longitudinal axis, a first closed axial end and a second open axial end, a nozzle configured to discharge the liquid through a discharge opening of the nozzle, and a liquid supply passage connected to the container and the nozzle and configured to transport the liquid from the container to the nozzle, wherein:

the electric blower is configured such that the fan causes the air to discharge through the discharge opening when the fan is rotated by the motor;

the body includes:

a housing part (i) that houses the motor and the fan, (ii) that extends along a rotation axis of the motor and the fan that defines a front-rear direction of the electric blower and (iii) having a nozzle-mounting part at a front end of the housing part in the front-rear direction;

a grip part (i) configured to be held by a user, (ii) protruding from the housing part (a) in an up-down direction that is perpendicular to the front-rear direction and (b) away from the motor and the fan and (iii) having an upper end connected to the housing part and a lower free end spaced from the housing part; and a battery-mounting part (i) connected to the lower free end of the grip part, (ii) spaced from the housing part, (iii) configured to removably receive a battery and (iv) having at least one container-mounting part;

the nozzle is attached to the nozzle-mounting part;

the container is attached to the at least one container-mounting part;

the container longitudinal axis is in the up-down direction; and the second open axial end is directed upwardly in the up-down direction.

* * * * *